United States Patent [19]

Black et al.

[11] Patent Number: 5,095,710
[45] Date of Patent: Mar. 17, 1992

[54] FROZEN CARBONATED BEVERAGE APPARATUS AND METHOD AND CONTROL SYSTEM THEREFOR

[75] Inventors: William J. Black, Coon Rapids; Joseph W. Kieffer, Maple Grove, both of Minn.; Darrell D. Brown, Grafton; Tom D. Tagliapietra, Glendale, both of Wis.

[73] Assignee: IMI Cornelius Inc., Anoka, Minn.

[21] Appl. No.: 495,876

[22] Filed: Mar. 19, 1990

[51] Int. Cl.⁵ .................................................. A23G 9/00
[52] U.S. Cl. ............................................ 62/68; 62/136; 73/54
[58] Field of Search ............... 62/136, 68; 73/54; 366/145

[56] References Cited

U.S. PATENT DOCUMENTS

| | | | |
|---|---|---|---|
| Re. 32,360 | 2/1987 | Martineau | 62/127 |
| 3,180,106 | 4/1965 | Brandt et al. | 62/177 |
| 3,279,205 | 10/1966 | Stoelting | 62/135 |
| 3,296,817 | 1/1967 | Stoelting | 62/225 |
| 3,298,190 | 1/1967 | Harker | 62/136 |
| 3,410,103 | 11/1968 | Cornelius | 62/136 |
| 3,460,713 | 8/1969 | Cornelius | 222/1 |
| 3,497,115 | 2/1970 | Cornelius | 222/146 X |
| 3,519,910 | 7/1970 | Pfaff et al. | 318/218 |
| 3,600,657 | 8/1970 | Pfaff | 318/218 |
| 3,608,779 | 9/1971 | Cornelius | 62/69 X |
| 3,698,203 | 10/1972 | Stoelting | 62/136 |
| 3,787,145 | 1/1974 | Keyes et al. | 417/250 |
| 3,868,050 | 2/1975 | Gorychka et al. | 222/509 |
| 3,898,866 | 8/1975 | Keyes et al. | 62/306 |
| 3,934,427 | 1/1976 | Keyes | 62/342 |
| 3,989,492 | 11/1976 | Keyes | 62/136 |
| 3,995,770 | 12/1976 | Schwitters | 222/56 |
| 4,083,200 | 4/1978 | Luxem | 62/342 |
| 4,084,407 | 4/1978 | Anhalt | 62/342 |
| 4,171,819 | 10/1979 | Martineau | 62/342 X |
| 4,201,558 | 5/1980 | Schwitters et al. | 62/70 |
| 4,203,461 | 5/1980 | Schwitters | 137/343 |
| 4,221,117 | 9/1980 | Martineau | 62/306 |
| 4,241,590 | 12/1980 | Martineau | 62/343 |
| 4,275,567 | 6/1981 | Schwitters | 62/136 |
| 4,364,491 | 12/1981 | Adamson | 221/267 |
| 4,364,666 | 12/1982 | Keyes | 366/142 |

(List continued on next page.)

FOREIGN PATENT DOCUMENTS

| | | |
|---|---|---|
| 0250245 | 6/1987 | European Pat. Off. . |
| 0290696 | 8/1987 | European Pat. Off. . |
| 0098653 | 6/1984 | Japan ............ 62/136 |

OTHER PUBLICATIONS

The Cornelius Company Service Manual Entitled "FCB (Solid State) Post Mix Dispenser Two Flavor Hot-Gas Defrost", 4/24/89.

Primary Examiner—William E. Wayner
Attorney, Agent, or Firm—Sten E. Hakanson

[57] ABSTRACT

The present invention concerns improvements in the electronic control of frozen carbonated beverage machines and improvements in electric defrost heaters used therein. A control scheme is shown that provides for accurately determining the viscosity of a semi-frozen beverage as a function of the torque of a drive motor used in the harvesting and mixing thereof. The torque is first calculated based upon the current and voltage to the motor and the phase difference there between. The torque is adjusted to compensate for motor efficiency after which the net torque value is converted to a viscosity scale. The viscosity scale has a zero value relating to the net torque experienced by the motor when the beverage is known to be completely liquid. Viscosity is maintained within a narrow range based upon pre-defined three level low, medium and high viscosity sets, and wherein compressor short-cycling is eliminated. Recalibration control is shown for reestablishing a new viscosity zero value to allow for changes in the net torque at the beverage known liquid point that can result from machine wear, inaccurate initial calibration and the like. A safety defrost control is shown for reducing potential hazards associated with the use of electric defrost heaters. Improved electrical defrost heaters are shown that allow for easy removal and replacement thereof.

52 Claims, 21 Drawing Sheets

U.S PATENT DOCUMENTS

| | | | |
|---|---|---|---|
| 4,383,417 | 5/1983 | Martineau | 62/127 |
| 4,390,760 | 6/1983 | Schwitters | 200/61.04 |
| 4,393,659 | 7/1983 | Keyes et al. | 62/342 X |
| 4,544,085 | 10/1985 | Frazer | 222/146.4 |
| 4,580,905 | 4/1986 | Schwitters et al. | 366/149 |
| 4,653,281 | 3/1987 | Van Der Veer | 62/71 |
| 4,653,928 | 3/1987 | Bravo | 62/342 X |
| 4,681,030 | 7/1987 | Herbert | 62/331 X |
| 4,736,593 | 4/1988 | Williams | 62/136 |
| 4,750,336 | 6/1988 | Margen | 62/59 X |
| 4,831,839 | 5/1989 | Anderson et al. | 62/308 |
| 4,869,072 | 9/1989 | Sexton et al. | 62/136 |
| 4,878,760 | 11/1989 | Newton et al. | 62/342 X |

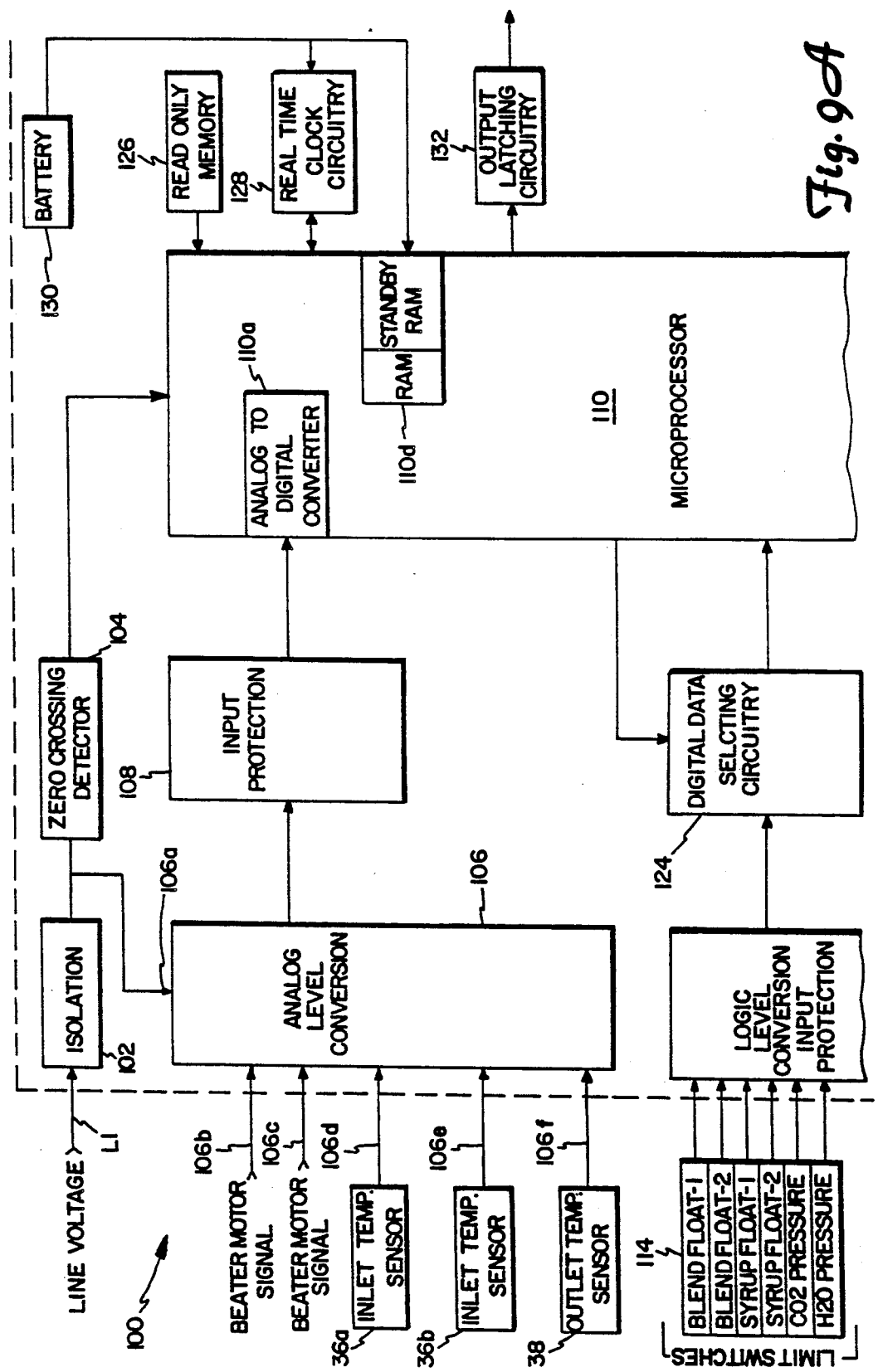

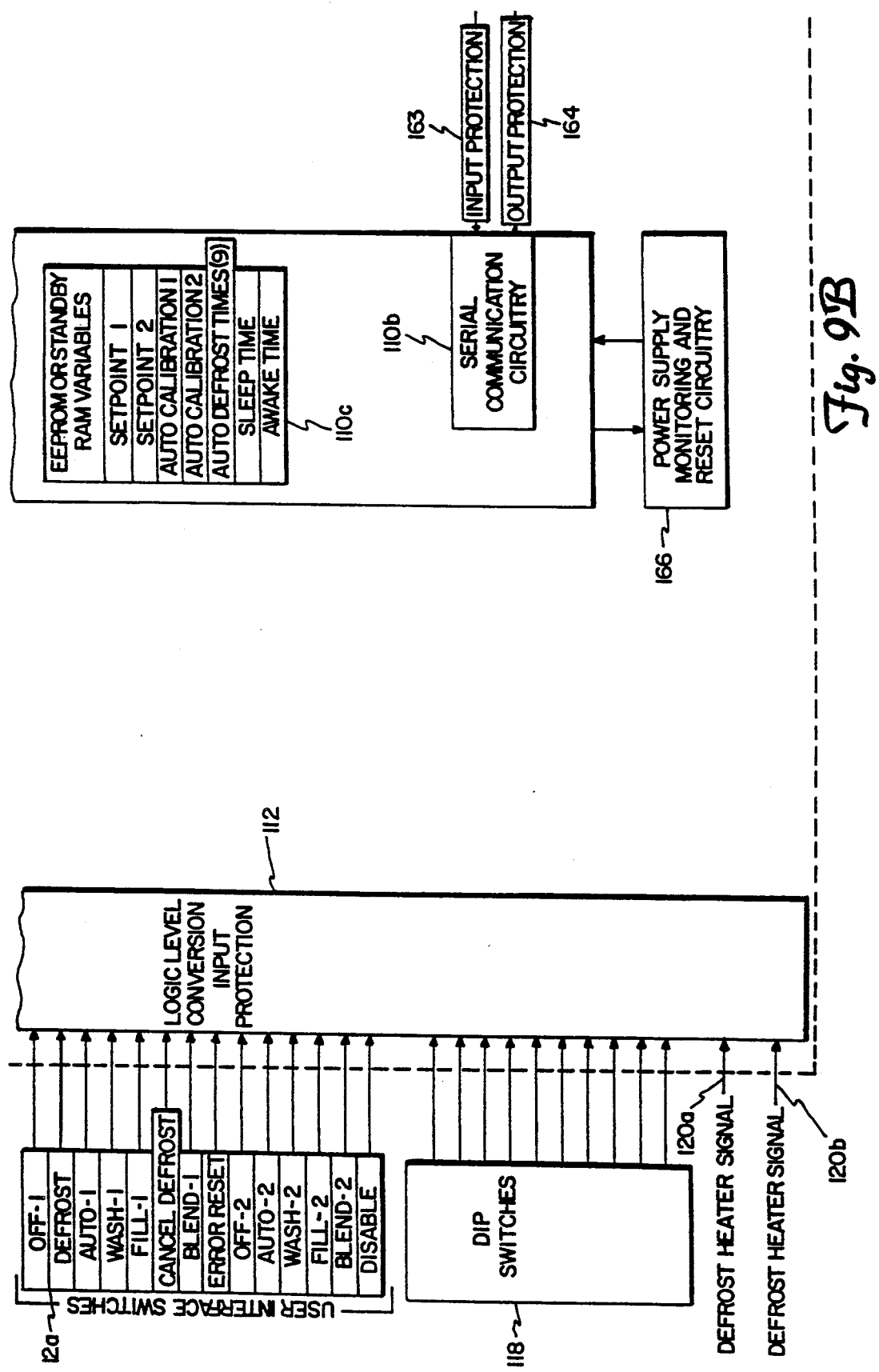

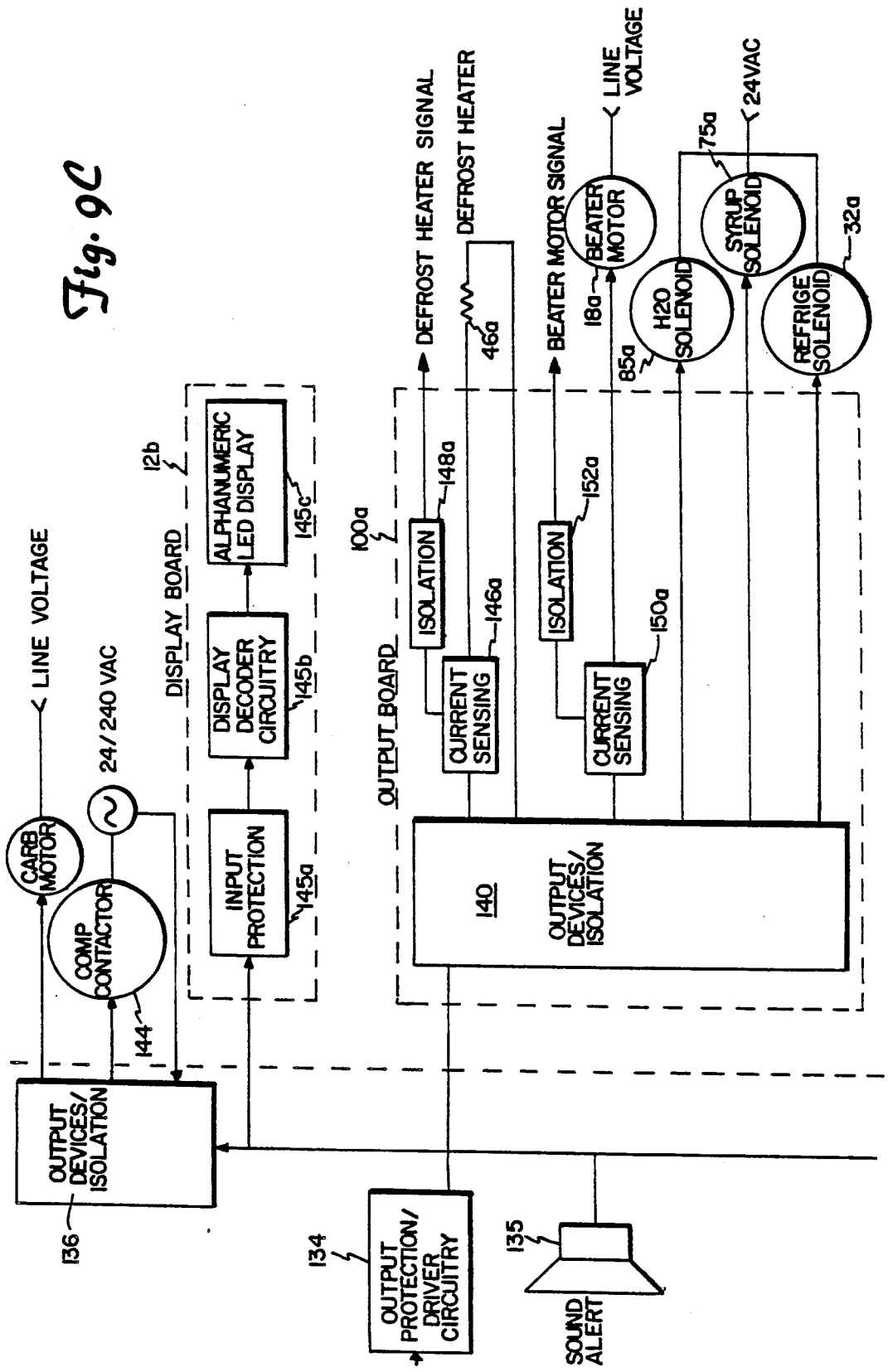

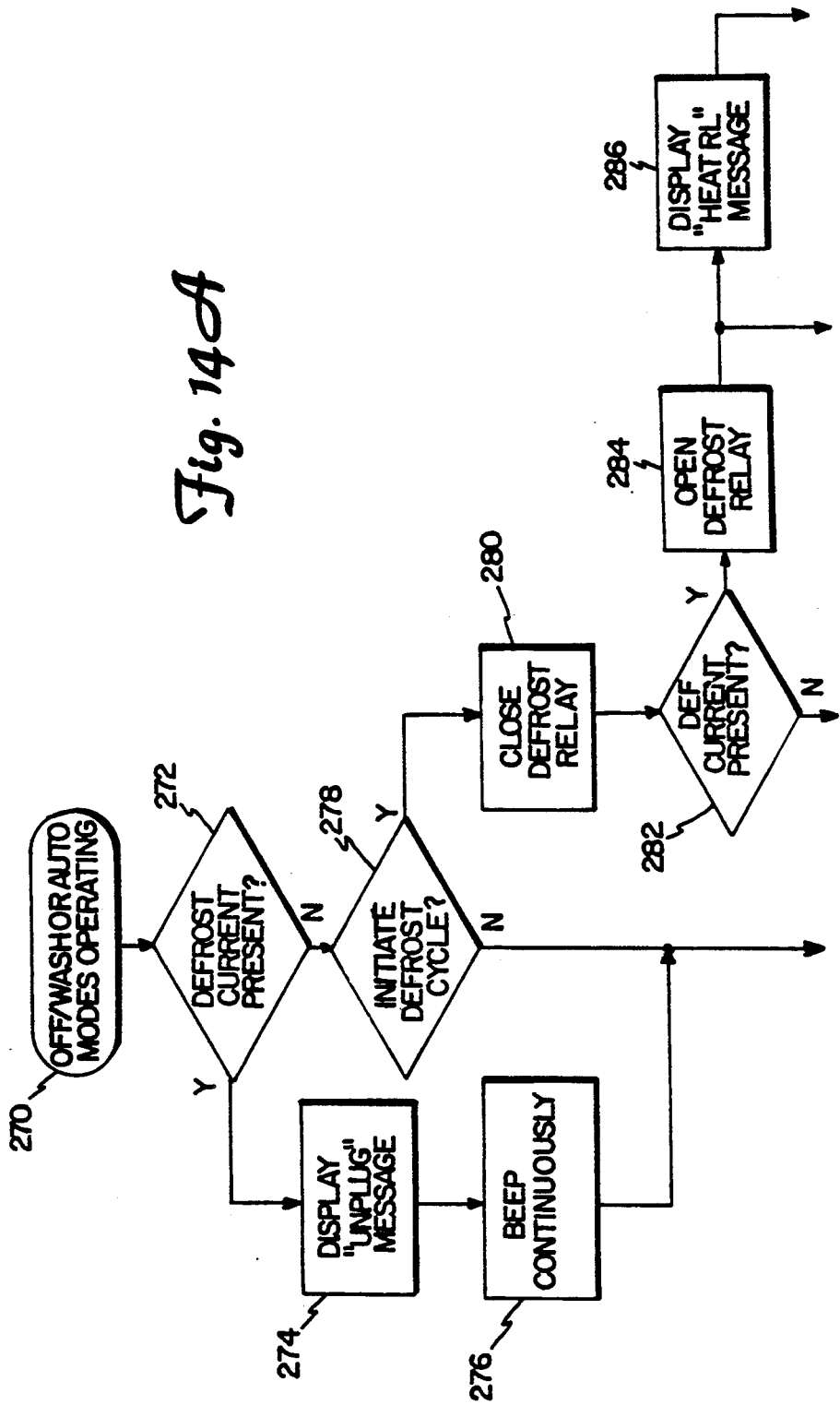

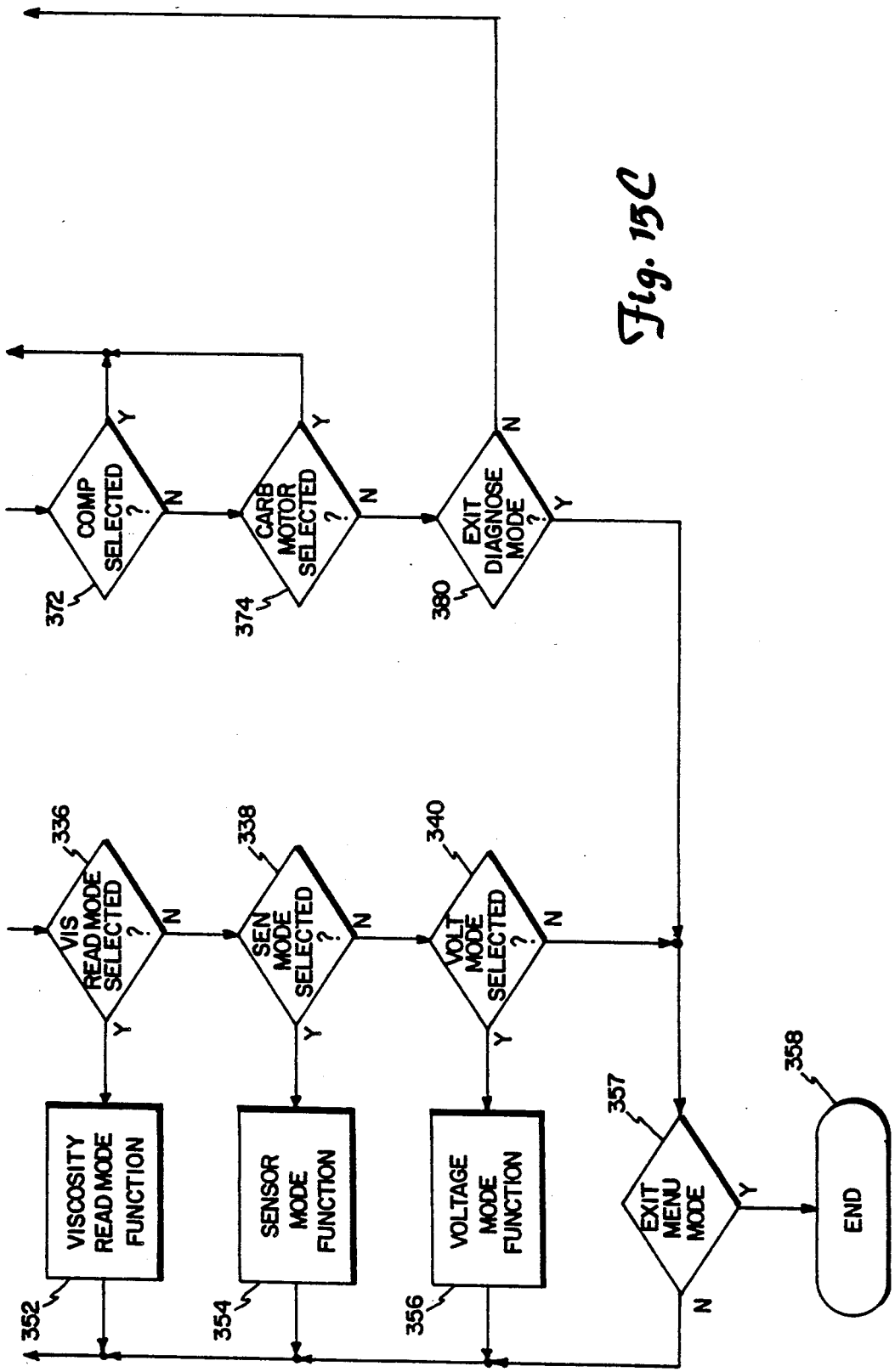

FROZEN CARBONATED BEVERAGE APPARATUS AND METHOD AND CONTROL SYSTEM THEREFOR

BACKGROUND

1. Field of the Invention

The present invention relates generally to frozen carbonated beverage dispensing equipment, and more particularly to control and defrosting apparatus therefor.

2. Background of the Invention.

Frozen carbonated beverage machines are well known in the art, as seen, for example, in U.S. Pat. Nos. 3,608,779 and 3,460,713 to Richard T. Cornelius. Such equipment is designed to produce a slush beverage from the partial freezing of a combination of carbonated water and syrup. This confection is made by the continual harvesting thereof from the interior perimeter of a refrigerated cylinder.

Originally, frozen carbonated beverage machines were operated electro-mechanically. However, it was found that changes in ambient conditions, rate of beverage dispensing and the like, would have a great effect on the viscosity of the beverage, causing a drink to become either unacceptably loose or firm, as electro-mechanical systems would react too slowly or would overcompensate. Electronic controls are now used to provide for an improved ability to maintain the beverage viscosity within a predetermined desired range. As is known in the art, electronically pulsed expansion valves can provide for precise refrigeration control. Also, sensing the torque or power consumption of the motors that drive the harvesting mechanism provides an indication of the viscosity of the beverage. Thus, viscosity control is exerted through the use of electronically pulsed expansion valves operated in accordance with the sensed harvesting motor torque. However, scraper motors power requirement during a freezing cycle includes the resistance that results as the harvesting mechanism removes the portion of the newly semi-frozen beverage from the cylinder walls, as well as other factors normally present. Such factors include the frictional resistance that results from the mere contact between the harvesting mechanism and the cylinder interior, the drag caused by the beverage itself and that resulting from the motors and associated drive train components. Prior art machines have not been able to differentiate well between these variables. Thus, for example, during a freezing cycle harvesting load can be falsely interpreted to indicate that the beverage held in the cylinder has reached a desired firmness, whereupon refrigeration is stopped by turning off the compressor. However, if the beverage were not sufficiently firm, the sensed load would decrease rapidly as the stopping of refrigeration ends the production of further frozen beverage, hence the harvesting load associated therewith. Thus, refrigeration can be prematurely terminated, only to be quickly re-started, as the F.C.B. machine control was not able to differentiate between the contribution of the two load factors. This ineffective control ability results in deleterious short-cycling of the compressor.

A further problem with respect to viscosity control relates to the ease of operation of the F.C.B. machine. Prior art machines inevitably require fine tuning and precise adjustment of the electronic hardware thereof by trained service personnel. Such adjustments can be frequent and of substantial cost and inconvenience to the owner/operator who lacks the skill and knowledge necessary to attempt any direct manipulations of the machines electronics. Adjustment can be required due to changes in scraper motor load that can occur over time as the machine is used and various moving components, such as the harvesting mechanism, motor components and drive train, wear. Thus, if the load sensed on the motors does not compensate for such changes, the resulting beverage viscosity will also change over time for any given viscosity setting.

Repair of an F.C.B machine can also be costly due to the amount of technician time that can be required to diagnose the particular problem. Thus, it would be very desirable to have an F.C.B. machine wherein the various sub-components could be quickly and easily evaluated.

It is also known in the art that the refrigeration components of an F.C.B. machine can be placed in a remote location and connected to the dispensing portion by appropriate refrigeration and water lines. In this manner the over-the-counter portion utilizes less space in the retail area. However, a problem with such units having remote refrigeration concerns the heating and defrosting of the cylinders that is periodically required for the removal of particulate ice formation in the beverage, and for maintenance or cleaning of the cylinders. Hot gas can be cycled from the refrigeration system through the evaporator coils to provide for the defrosting. However, if the lines connecting the remote refrigeration unit to the cylinders are exposed to excessively cold ambient conditions, the hot gas may not be of sufficient temperature to provide for adequate defrosting when it reaches the evaporator coils. Thus, electrical heating of the cylinders has been used. These prior art heaters are generally tubular and lie adjacent and parallel to the cylinders and in direct contact with the evaporator coils. The cylinders and heaters are held within a cylinder box sub-structure, the void areas of which are filled with a foam insulation. If a heater should fail, repair of the cylinder box can be very costly as such repair necessitates the time consuming steps of removal of the cylinder box from the machine, removal of the insulation, replacement of the heater and, finally, re-insulating and replacement of the box in the machine. Therefore, it would be desirable to provide for easily replaceable electric heaters in an F.C.B. machine. It would also be desirable to have an F.C.B. machine that provides for improved monitoring and control of electrical defrost heaters to minimize any hazards associated with the operation thereof.

SUMMARY OF THE INVENTION

The present invention concerns an electronic control having particular programming for use in a frozen carbonated beverage machine. The control includes a micro-processor connected to various sensing devices and machine operating systems for exercising control over the consistency of the dispensed beverage in response to the sensed information supplied to the processor. Specifically, harvesting motor power consumption is sensed and converted to a displayable viscosity value of a scale running from −9 to 99. The zero value of the scale is established at the end of each defrost cycle and represents the cumulative motor load at a point at which the beverage viscosity is known to be zero. The pre-defined viscosity scale is established having several discrete settings wherein each setting has associated therewith a low, medium and high viscosity number. Each number corresponds proportionately to a sensed power consumption of a harvesting motor. Viscosity is controlled by a programmed series of steps wherein, after selection of a desired viscosity value, as represented by a low number, refrigeration is commenced and semi-frozen beverage is harvested from the cylinder walls. Motor torque is sensed periodically, and when that torque, after numerical conversion to the corresponding viscosity value, exceeds the viscosity high value, the expansion valves are closed stopping refrigeration. At this point however, the compressor continues to operate. A predetermined period of time is allowed to run subsequent to the closure of the expansion valves during which motor power, hence viscosity, is sensed. If the viscosity of the beverage goes below the middle level during the predetermined time period, the valve is opened and refrigeration of the cylinder is restarted. Refrigeration continues until the viscosity again exceeds the high value whereupon the time period is started again. If the viscosity does not go below the middle value during the time period, the compressor is also shut off. It can be appreciated that the closing of the valves stops refrigeration during the predetermined time period so that semi-frozen beverage production is halted, whereby the load on the motor will be due solely to the viscosity of the beverage as the other load variables were factored out when the zero value was established.

As stated above, the zero value is determined at the end of each defrost cycle when the beverage is completely liquid. At that time, the harvesting motor torque is sensed, converted to the viscosity scale and that zero value stored in non-volatile memory means. Thus, the present invention provides for recalibration of the viscosity zero value after each defrost. Recalibration is necessary to account for any changes that may occur due to wear of the harvesting motors and associated drive trains and harvesting mechanism that can cause inaccuracies in the zero value set point. Also, recalibration can correct for any initial calibration errors that can occur during original set-up of the machine, for the differences in efficiency variables that are known to exist between drive motors of the same type and manufacture, and for other such related variables. It will be appreciated that as a new viscosity zero value is stored in the nonvolatile memory after each defrost it is possible to use the previous number for comparison with the latest zero value. In the present invention, if the latest zero value exceeds a predetermined margin, the new value will be compensated for by an addition or subtraction of an appropriate value. Thus, the present invention can automatically adjust for wear of the various moving elements that occurs over time so that the viscosity of the dispensed beverage remains the same for a given viscosity setting as the machine ages. In addition, the control of the present invention keeps track of the totals of all recalibrations and will not permit adjustment outside of a predetermined range.

The present invention also includes a plurality of touch pad switches and a display for operator interface with the microprocessor. The operator, through use of the touch pad, may select a desired viscosity value from a range thereof. The electronic control then regulates beverage consistency automatically, as above described, without further requirements of the operator. If a more firm or less firm drink is desired, the operator through use of the touch pad and display selects a higher or lower viscosity value number respectively. Thus, the present invention greatly simplifies the maintaining of a consistent beverage viscosity in a frozen carbonated beverage machine.

The invention herein also includes a diagnose function wherein the touch pad switches provide for incrementing through and energizing various machine subcomponents. Thus, for example, a beater motor or expansion valve can be individually selected and briefly pulsed or energized so that the operation thereof can be verified.

The present invention also includes electrical tube heaters wherein the heating element of each heater is releasably held within an outer tubular sealed housing. If a heating element fails, such an element is simply removed from the outer housing tube. In this manner the cost of electric heater replacement is greatly reduced as the cylinder box can remain in the machine and the foam insulation does not have to be disturbed.

A control scenario is also shown that greatly reduces hazards associated with the use of electrical heaters. The programmed control monitors current in each pair of heaters separately and operates dual relay circuits accordingly to insure the correct current flow therethrough. The dual relays provide for redundant assurance that current flow to the heaters can always be terminated. The safety control also provides for a message display of an error condition and for an audible alarm.

DESCRIPTION OF THE FIGURES

Further objects, features, and advantages of the present invention will become evident in light of the following detailed description, which description refers to the following drawings, wherein.

DETAILED DESCRIPTION

Figure 1:
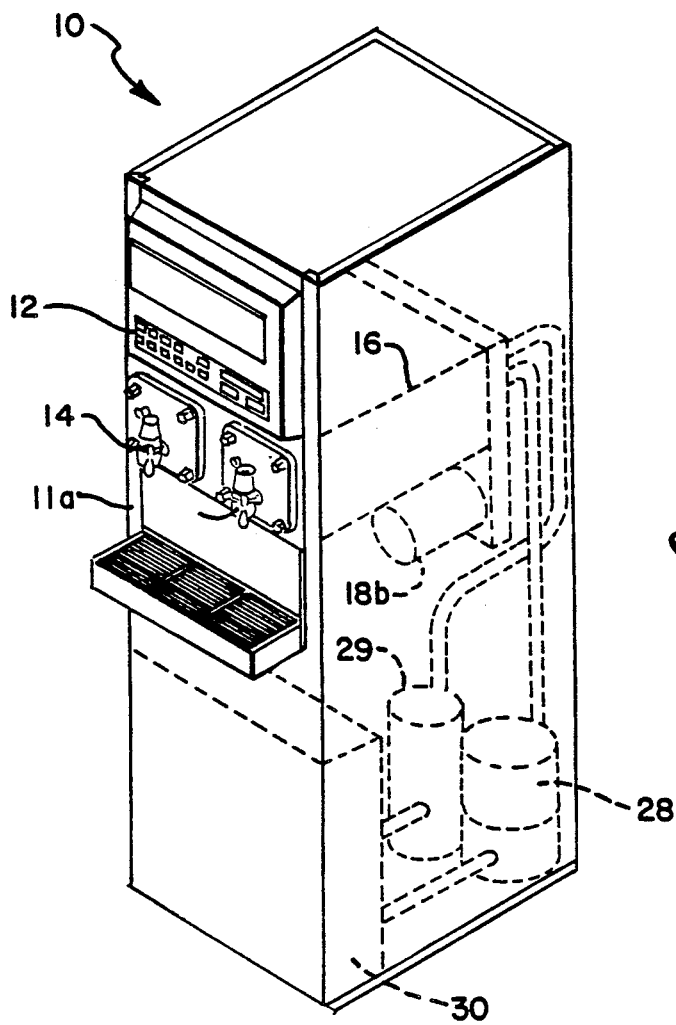
FIG. 1 shows a perspective view of a frozen carbonated beverage machine.
Figure 2:
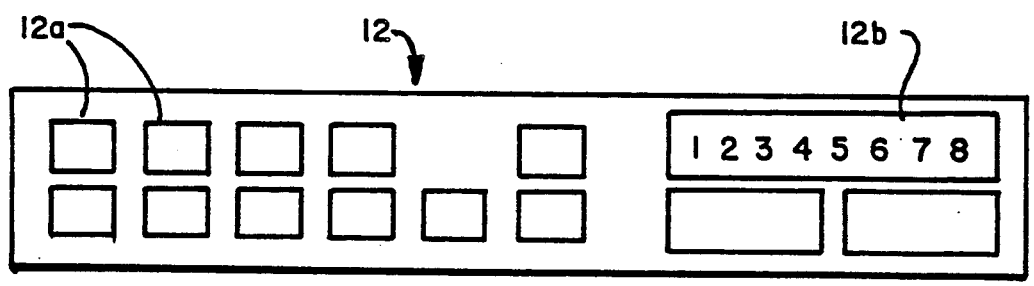
FIG. 2 shows a enlarged detailed view of the control panel of the frozen carbonated beverage machine.
Figure 3:
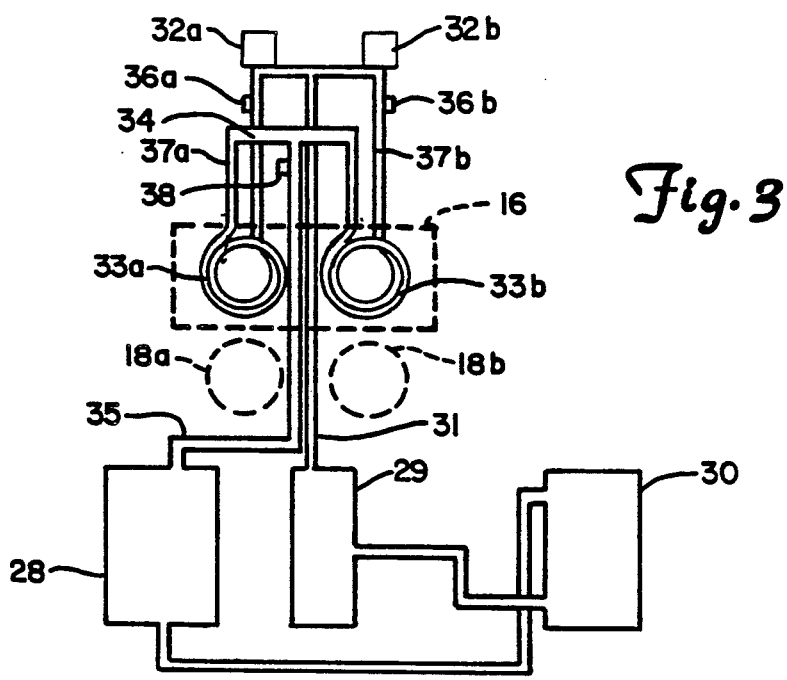
FIG. 3 is a schematic representation of a refrigeration system for a frozen carbonated beverage machine.
Figure 4:
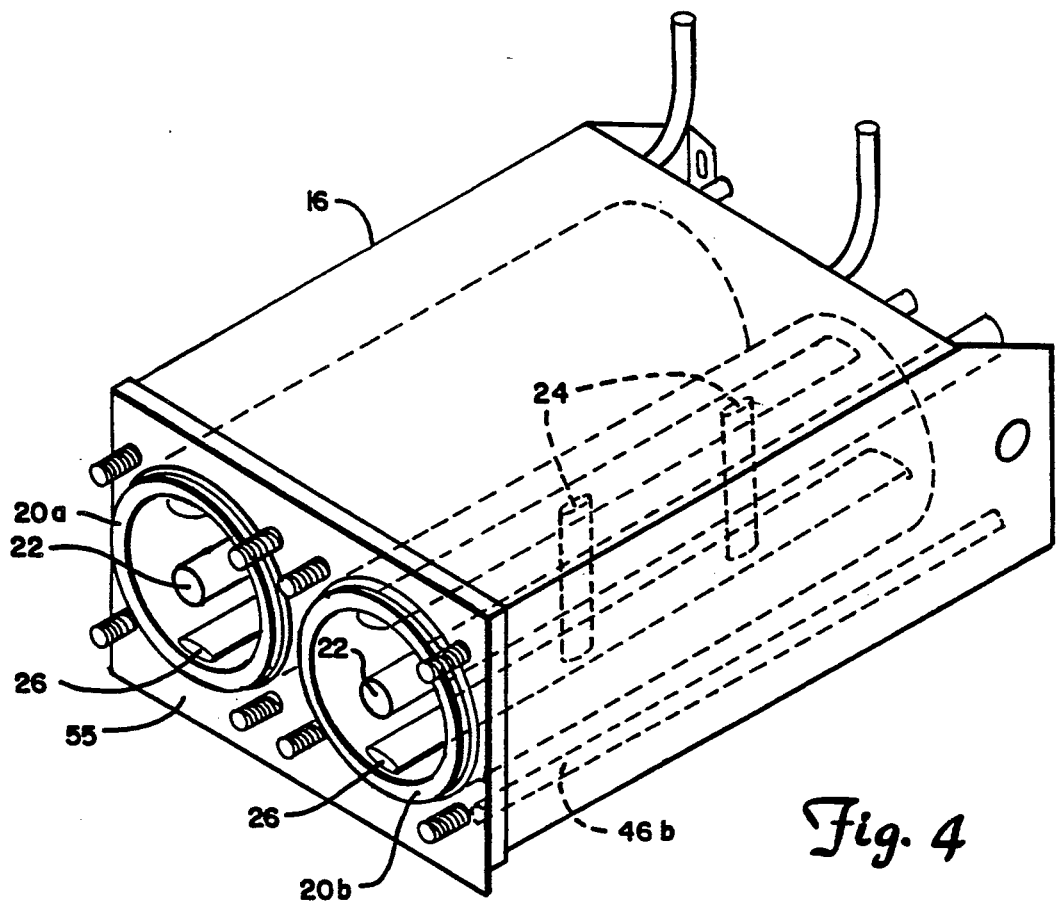
FIG. 4 shows a perspective view of a freeze cylinder box unit.

A frozen carbonated beverage (F.C.B.) machine, generally designated 10, is seen in perspective view in FIG. 1, and includes an outer housing 11 having a front surface 11a. Surface 11a includes a control panel 12, also seen in FIG. 2, having pressure sensitive switches 12a and a light emitting diode (L.E.D.) display 12b. Valves 14 provide for dispensing beverage from machine 10. In describing the present invention a two cylinder F.C.B. machine is illustrated, although such a machine can have various numbers of cylinders.

Referring to FIGS. 3-7, machine 10 includes a cylinder box 16, harvesting assembly drive or beater motors 18a and 18b, for each cylinder 20a and 20b, and refrigeration means. Box 16 contains the two beverage cylinders 20a and 20b, and each cylinder includes a scraper or harvesting assembly having a central axial rod 22, scraper blade support beater bars 24 and scraper blades 26 pivotally secured to beater bars 24.

The refrigeration means includes a compressor 28, reservoir 29, and a condenser 30. Reservoir 29 is connected by a line 31 to electronically pulsed expansion valves 32a and 32b. Expansion valves 32a and 32b control the delivery of refrigerant to coils 33a and 33b respectively. Coils 33a and 33b flow into a common outlet 34 which, in turn, is connected to compressor 28 by line 35. Both coils 33a and 33b have refrigerant temperature sensors 36a and 36b respectively, secured to each of the inlets 37a and 37b thereof. A refrigerant temperature sensor 38 is secured to common outlet 34.

Figure 5:
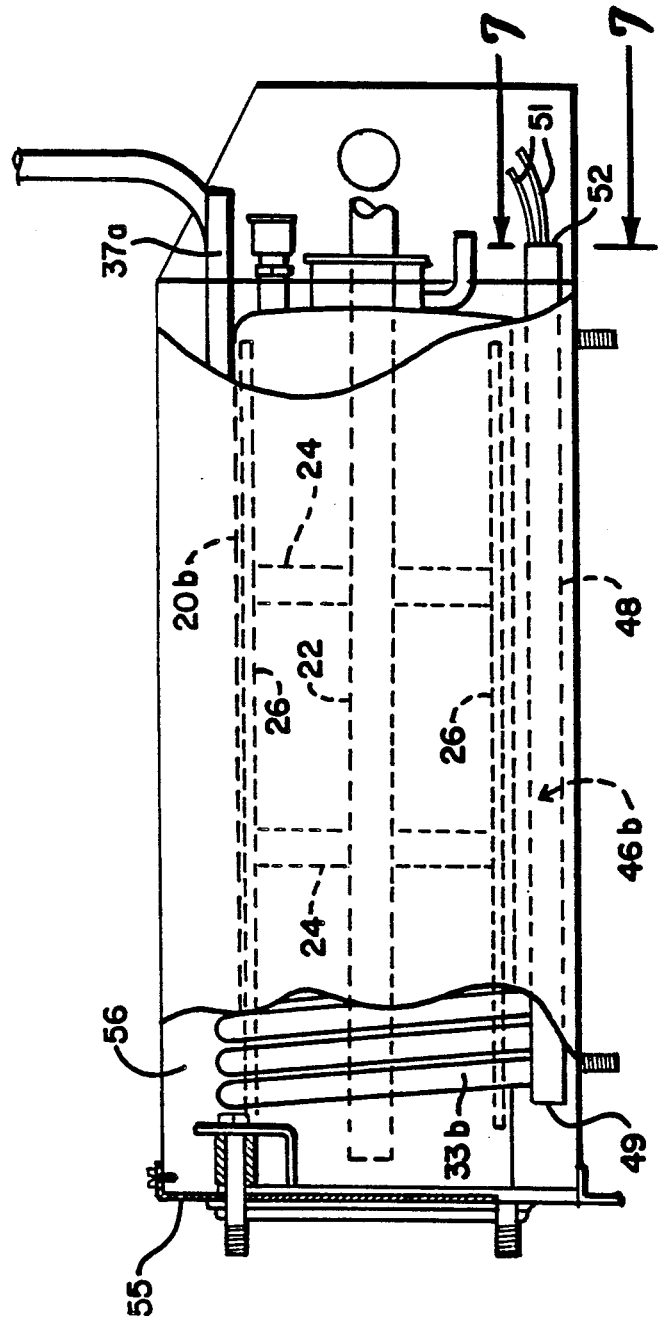
FIG. 5 is a partially cut-away side view along lines 4—4 of FIG. 3.
Figure 6:
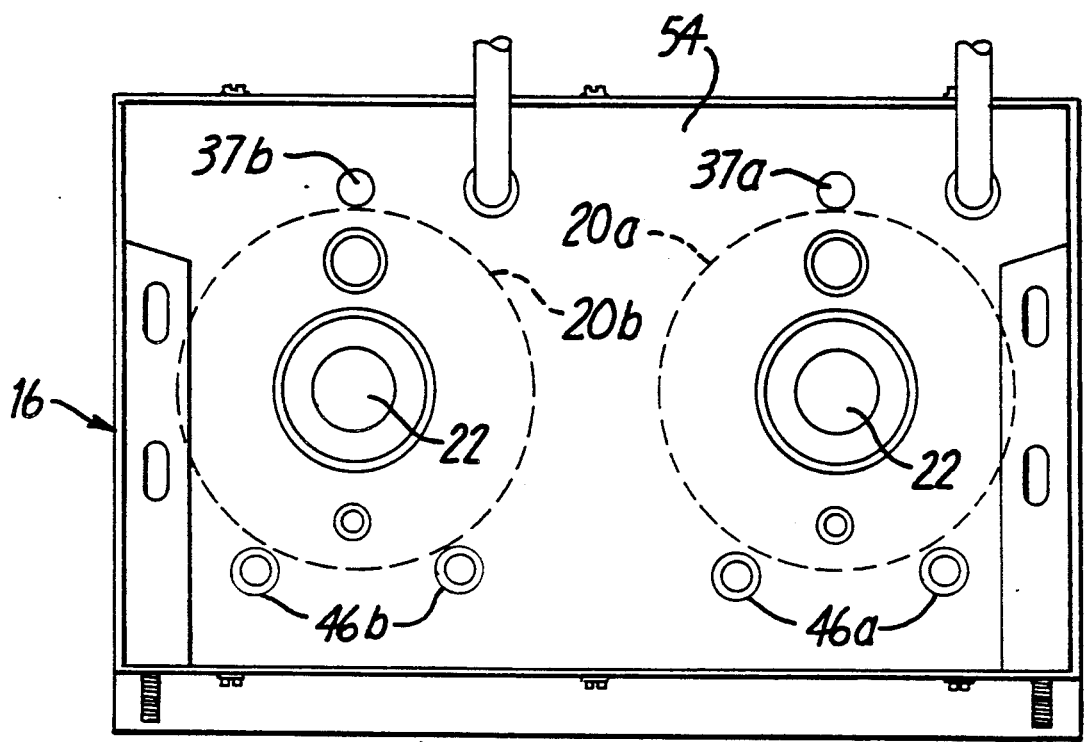
FIG. 6 shows an end view along lines 5—5 of FIG. 3.
Figure 7:
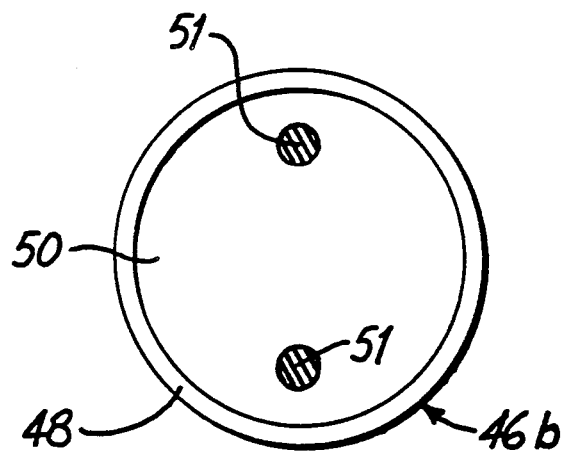
FIG. 7 is an enlarged view of an electrical defrost heater of the present invention along lines 6—6 of FIG. 4.

As is seen in FIG. 5, evaporator coil 33b encircles cylinder 20b, it being understood that coil 33a likewise encircles cylinder 20a. Two pairs of heaters 46a and 46b having stainless steel tube bodies 48 with sealed ends 49, are welded to the individual evaporator coils 33a and 33b respectively. It can be seen by referring to FIG. 5, that heater pairs 46a and 46b are secured to their respective evaporators at positions thereon approximating five and seven o'clock around the perimeter thereof. Each heater 46a and 46b includes a cartridge-type heating element 50 having wires 51 for connection to a source of electrical power. Tube bodies 48 have an inside sized to allow for slidable insertion of cartridge elements 50 therein. In addition, it has been found desirable to plate the surfaces of tubes 48 with copper to provide for improved heat dispersion. Heaters 46a and 46b extend substantially along the entire length of evaporators 33a and 33b and terminate with open ends 52 exterior of rear plate 54 of cylinder box 16 (see FIGS. 5 and 6). As is known in the art, after cylinders 20a and 20b, and associated evaporator coils 33a and 33b, and heaters 46a and 46b are secured to cylinder box front surface plate 55 and rear plate 54, the remaining interior or void areas of cylinder box 16 are filled with a foam insulation 56.

Figure 8:
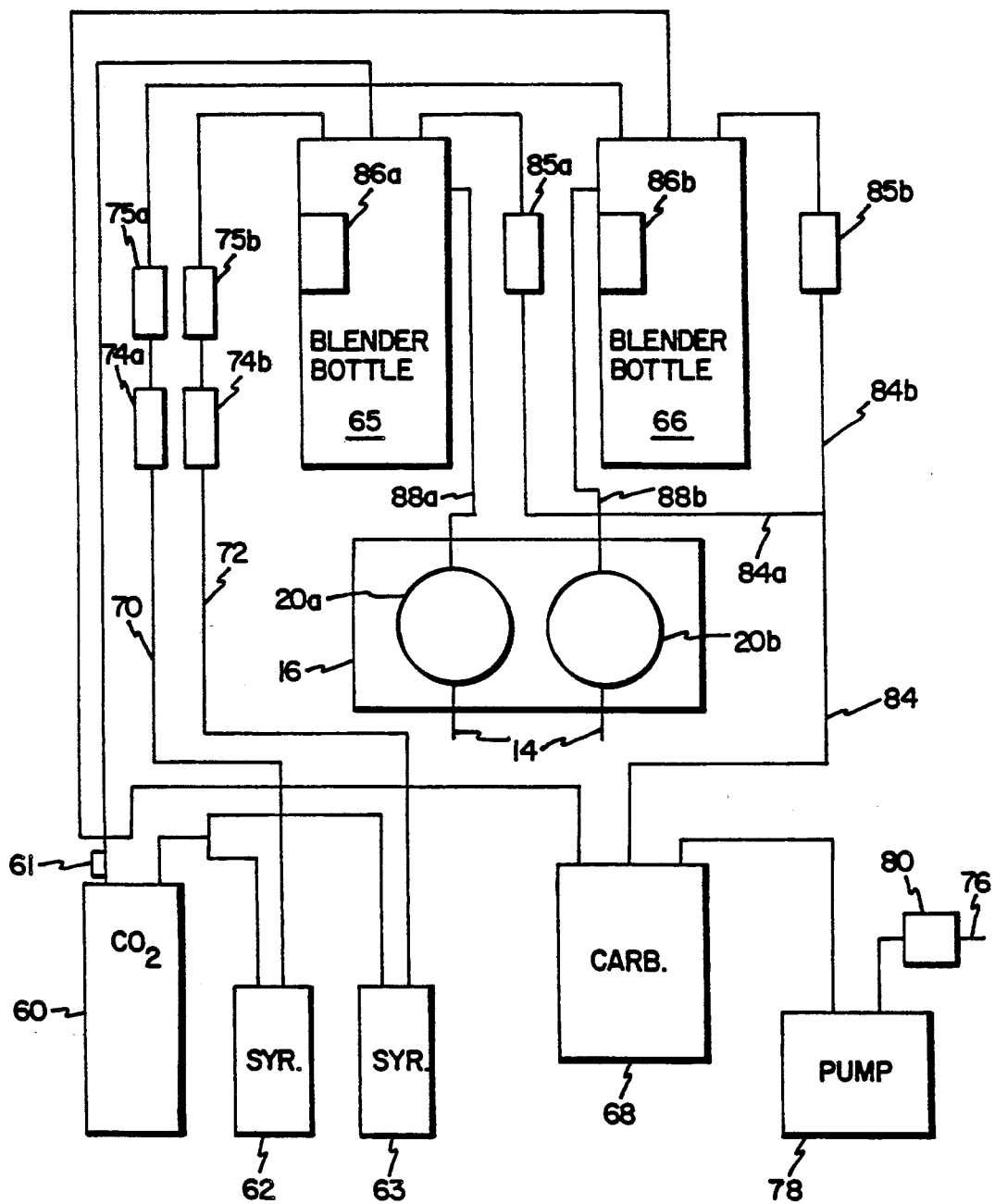
FIG. 8 shows a schematic diagram of the major components of a frozen carbonated beverage machine and their fluid interconnection.

FIG. 8 shows the basic components of machine 10 in schematic diagram showing their fluid inter-connections. Machine 10 includes a regulated pressurized source of carbon dioxide 60, having a carbon dioxide pressure sensor 61 providing a regulated supply of carbon dioxide to each of syrup tanks 62 and 63, blender bottles 65 and 66, and carbonator 68. Syrup reservoir 62 provides syrup to blender bottle 66 along syrup line 70 and syrup reservoir 63 provides syrup to blender bottle 65 along syrup line 72. Syrup lines 70 and 72 include syrup sold-out float switches 74a and 74b for detecting the presence or absence of syrup and syrup solenoid valves 75a and 76b for regulating the flow of syrup to bottles 65 and 66. A source of potable water, not shown, provides water along line 76 to a carbonator pump 78. Line 76 includes a water pressure indicator 80. Carbonator pump 78 provides a pressurized supply of potable water to carbonator 68 through line 82. As is understood in the art, carbonator 68, in turn, provides a source of carbonated water along line 84 and branches 84a and 84b thereof to blender bottles 65 and 66 respectively. Lines 84a and 84b have carbonated water solenoid valves 85a and 85b therein for controlling the flow of carbonated water to blender bottles 65 and 66. Blender bottles 65 and 66 include beverage level sensors 86a and 86b respectively, and provide a supply of liquid beverage along lines 88a and 88b to freezing cylinders 20a and 20b for freezing therein and ultimate dispensing therefrom by valves 14.

Figure 9D:
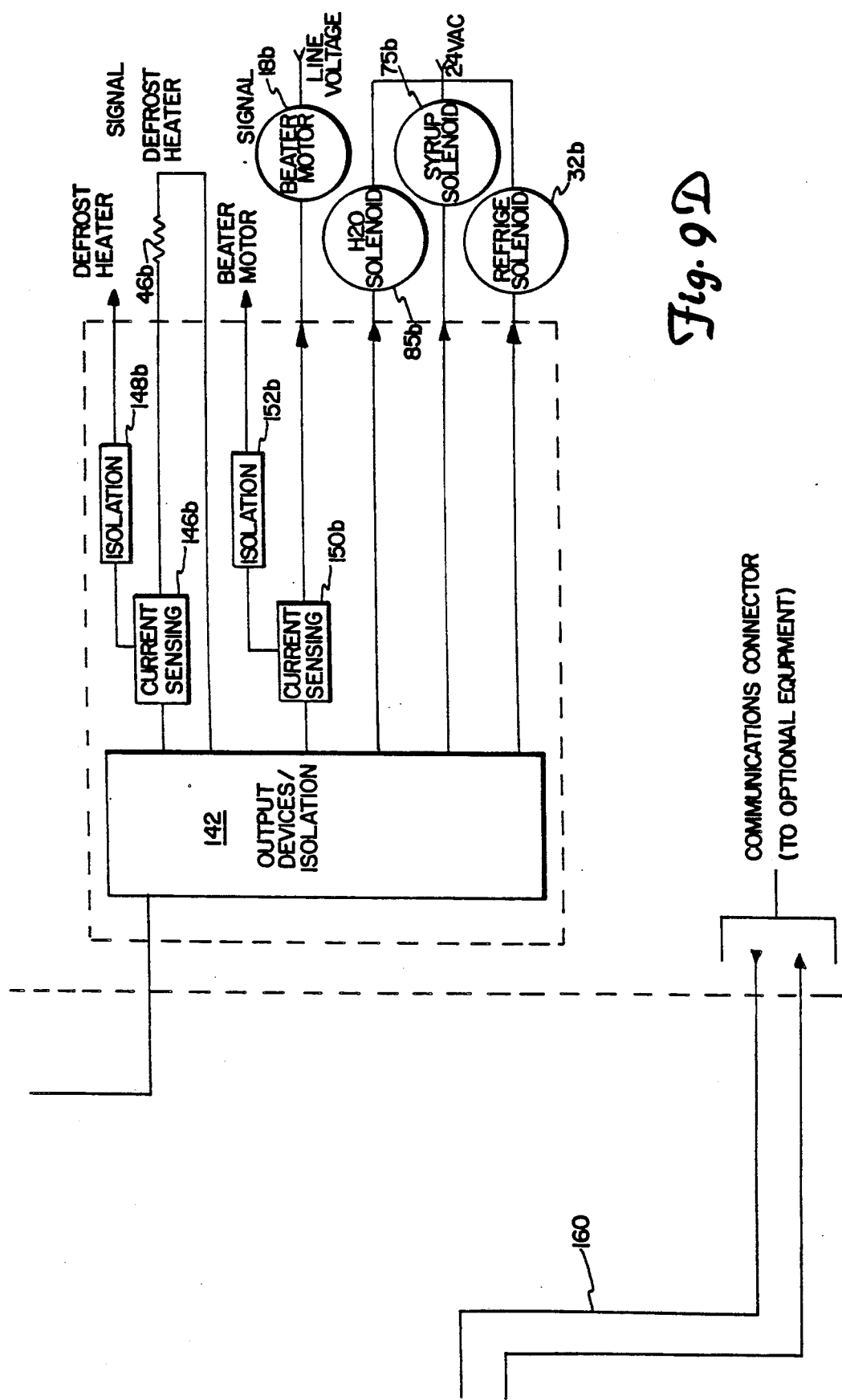
FIG. 9 shows a block diagram of the electrical control system of the present invention.

A block diagram of the electronic control of the present invention is seen in FIG. 9, and generally designated numeral 100, and includes two control boards 100a and 100b. It will be understood by those of skill that the various components or circuits of control 100 are well known in the art and, therefore, a detailed description of the specific schematics thereof will not be included herein. Line current is brought in on line to isolation circuit 102 and, in turn, to zero crossing detection circuit 104. Circuit 102 provides for the necessary isolation and step down of voltage from the line voltage of nominally 240 volts AC to the lower voltages required by the components of circuit 100. Circuit 102 provides a voltage signal at input 106a to analog-level-conversion circuit 106. Analog level conversion circuit 106 receives signals at inputs 106b and 106c from each motor 18a and 18b and receives signals at inputs 106d and 106e from inlet temperature sensors 36a and 36b, respectively, and receives signals at input 106f from outlet temperature sensor 38. The signals from level conversion circuit 106 are sent to input protection circuit 108 and from there are communicated to the analog digital converter 110a of microprocessor 110. Zero-crossing or sync circuit 104 is connected directly to processor 110 and provides information regarding the phase difference between the voltage at input 106a and current at each input 106b and 106c. Microprocessor 110 is a high density complementary metal-oxide integrated circuit identified as MC68HC11A1 made by Motorola and includes the on chip capabilities of an eight channel analog-to-digital (A/D) convertor 110a having eight bits of resolution, a synchronous serial communications interface 110b, 8K bytes of read-only memory (ROM), not shown, 512 bytes of electrically erasable programmable ROM (EEPROM) 110c and 256 bytes of random-access memory (RAM) 110d, and is capable of addressing 64K bytes of external ROM.

Control 100 further includes a logic level conversion input protection circuit 112 receiving inputs from limit switches 114, user interface switches 12a, dip switches 118, and inputs 120a and 120b, representing signals from defrost heater pairs 46a and 46b respectively. Circuit 112 is connected to digital data selecting circuitry 124 that, as is known in the art, serves to protect processor 110 and regulate the flow of information thereto. A read-only memory 126 is connected to microprocessor 110 and provides additional ROM storage. A real time clock 128 is connected to processor 110 and includes a battery 130. Processor 110 is also connected to output latching circuitry 132 which, in turn, is connected to output protection/driver circuitry 134. As will be appreciated by those of skill, output latching circuitry 132 and protection/driver circuitry 134 provide for safe and efficient connection to output isolation circuitry 136, display board 12b, output isolation circuitry 140 of output board 100a and output isolation circuit 142 of output board 100b and audible alarm 135.

Isolation circuit 136 provides for safe connection to the higher voltage carbonator pump 78 and compressor 28. The connection to compressor is indirect through compressor contactor or relay 144.

Display board 12b, as understood by those of skill, includes input protection, and display decoder circuitry, 145a and 145b respectively, connected to an alpha numeric eight digit LED display 145c.

It will be appreciated by those of skill that the boards 100a and 100b relate to the control of various components associated with cylinders 20a and 20b, and are identical in that regard. Output isolation circuit 140 is connected to a current sensing circuit 146a, which circuit is connected in series with defrost heaters 46a. Current sensing circuit 146a is connected to an isolation circuit 148a for providing the signal to input 120a. Circuit 140 is also connected to current sensing circuit 150a which, in turn, is connected to beater motor 18b for sensing the current use thereof. Isolation circuitry 152a is connected to circuit 150a so that the beater motor current signal can be safely supplied to input 106b of analog level conversion circuitry 106. Output device/isolation circuit 140 also provides control signals to refrigeration expansion valve 32a, carbonated water supply valve 85a and syrup valve 75a. In board 110b, output isolation circuit 142 is connected to a current sensing circuit 146b, which circuit is connected in series with defrost heaters 46b. Current sensing circuit 146b is connected to an isolation circuit 148b for providing the signal to input 120b. Circuit 142 is also connected to current sensing circuit 150b which, in turn, is connected to beater motor 18a for sensing the current use thereof. Isolation circuitry 152b is connected to circuit 150b so that the beater motor current signal can be safely supplied to input 106c of analog level conversion circuitry 106. Output device/isolation circuit 142 also provides control signals to refrigeration expansion valve 32b, carbonated water supply valve 85b and syrup valve 75b.

Serial port 110b of microprocessor 110 is connected to lines 160 and 162, each having respective input and output protection circuits 163 and 164, for providing communications to external equipment, such as a personal computer. Dip switches 118 provide for alternating between various pre-programmed messages that are shown, if desired, on display 12b. Microprocessor 110 is also connected to a power supply monitoring and reset circuitry 166.

Figure 10:
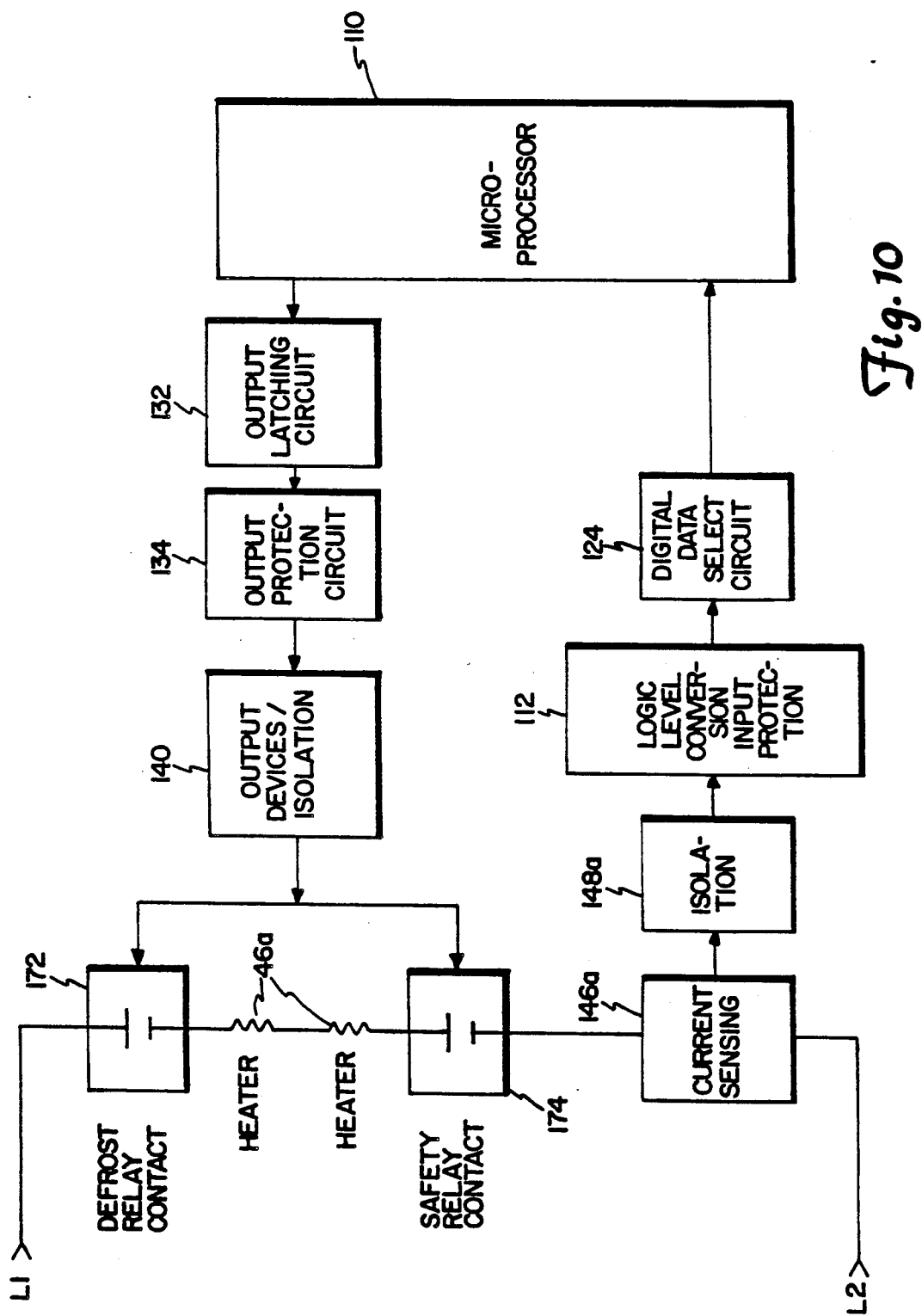
FIG. 10 shows an electrical schematic of the heater safety circuit of the present invention.

As seen in FIG. 10, a further detailed view of the manner of connection of heater pair 46a to a 240 VAC power source and to processor 110 is shown. For the purpose of efficiency of description of the present invention, the connection of heaters 46a is shown, it being understood that the connection of heaters 46b is the same. Heaters 46a are connected in series to a source of 240 VAC, lines L1 and L2. Current sensing means 146a is also connected to lines L1 and L2 along with a normally open relay defrost switch 172 and a normally open safety defrost relay switch 174. Sensor 146a, as previously described, is connected to processor 110, through isolation circuit 148a, conversion input protection circuit 112, and selecting circuit 124, and relays 172 and 174 are connected to processor 110 through isolation circuit 140, protection circuit 134 and latching circuit 132.

Control 100 provides for the periodic and continuous determining of the beverage viscosity in cylinders 20a and 20b. As is known in the art, viscosity is determined as a function of the power or torque consumption experienced by each motor 18a and 18b individually, wherein an increasing torque reading indicates an increasingly viscous beverage, as greater power is required to maintain a constant stirring rate of the harvesting mechanism. Various electro-mechanical and electronic strategies have been employed to determine the power consumption or torque experienced by an electric motor. Control 100 employs an electronic approach in accordance with the equation $P = E \times I \times \text{COSINE } O$, i.e. where power (P) is equal to the product of the voltage (E) times the current (I) times the cosine of the angle (O) of the phase difference between the voltage and current. Zero crossing or sync circuit 104 provides the phase difference information, and isolation circuit 102 includes a voltage detection circuit means, not shown, for determining voltage, that signal being provided at input 106a. The current is determined from inputs 106b and 106c from motors 18a and 18b individually. Thus, processor 110 receives the information necessary for determining the power consumption of each motor 18a and 18b separately. Processor 110 is an 8-bit microprocessor; however chips of larger computational ability, such as 16 or 32 bit microprocessors could also be used. An 8-bit processor currently provides for a cost savings, however is disadvantaged by reduced computational speed in comparison to larger processors. Thus, as is done in the present invention, and as is known in the art, look-up tables of pre-defined information are preferably used as a means to reduce the computational load on the microprocessor.

Figure 11:
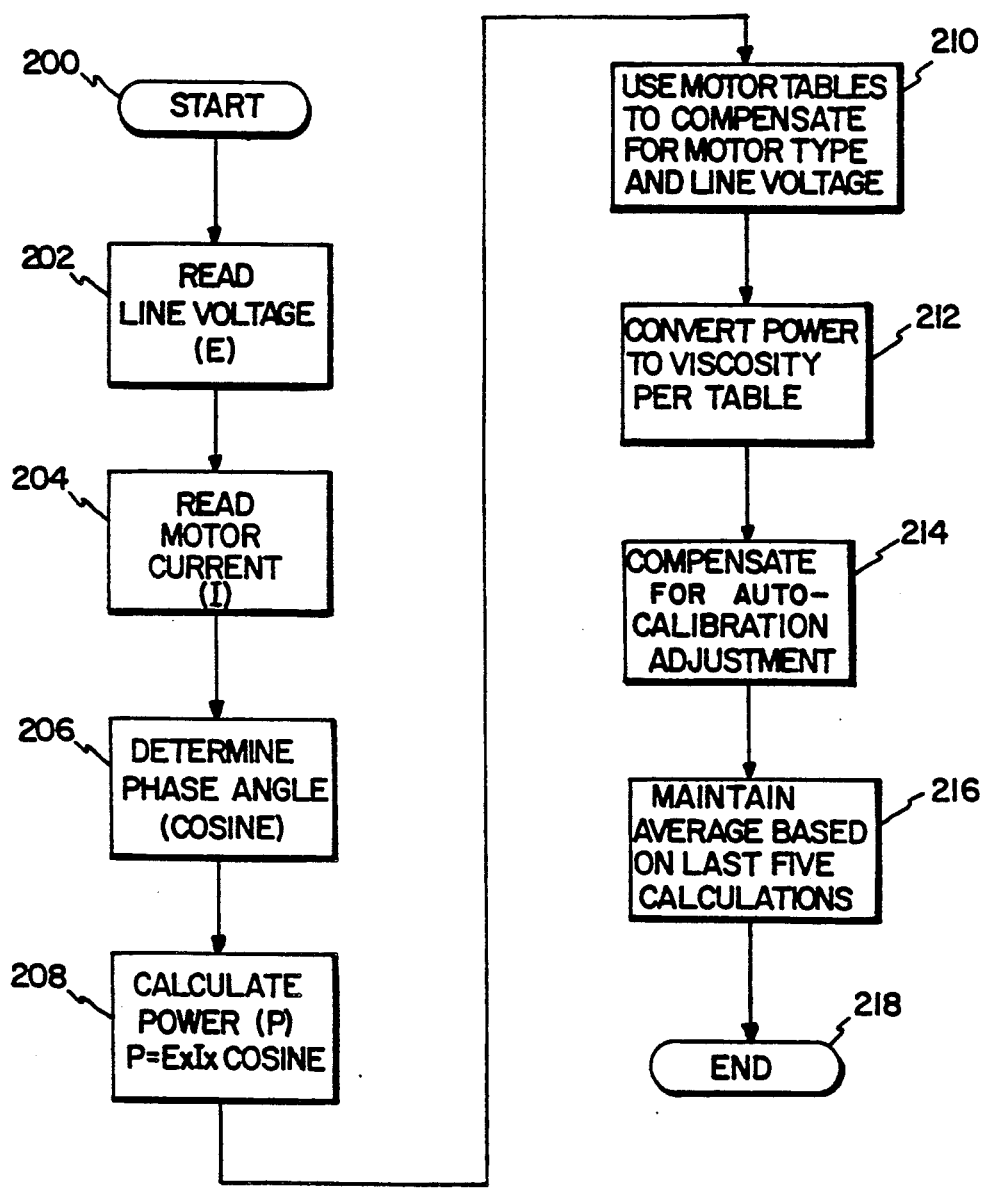
FIG. 11 shows a flow diagram of the load sensing function of the present invention.

A more thorough knowledge of the manner of viscosity sensing in the present invention can be had by reference to FIG. 11, wherein the functional programming steps related thereto are shown. As seen therein, after a start point (block 200) power is calculated and monitored by microprocessor 110 by first reading the line voltage provided at input 106a (block 202) reading the motor current provided by outputs 106b and/or 106c, depending upon which beater motor load is being determined (block 204) and determining the phase angle (block 206) as supplied by zero crossing circuit 104. Power is then calculated by processor 110 as the product of these three variables (block 208).

It will be understood that electrical motors vary as to their efficiency of converting electrical energy to the kinetic energy of motion, which in the present invention is the movement of the harvesting mechanism and related drive train components. Such efficiency depends upon the line voltage and the particular type of motor being used. In the present invention, motors 18a and 18b are rated at ¼ horsepower, and are made by General Electric. The efficiency motor curves therefor are determined by experimental application of various voltages over the anticipated voltage range. The results of such tests provide for efficiency curve information which is stored in tabular form within Rom 126. Thus, after calculation of the power the table is used to compensate for the motor efficiency based upon the sensed line voltage (block 210). The power value is then converted to a "gross" viscosity value (block 212) as per a second table stored in ROM 126 providing the relation between the recalculated power consumption and a corresponding viscosity whole number. In a preferred embodiment of the present invention, power consumption ranges typically from 100 to 300 watts, and is converted to an arbitrary viscosity scale running from −9 to 99, with the zero value of the scale representing the load when the beverage is completely liquid. Such a viscosity scale provides for a one or two digit whole number that is easy to use and easily displayed. The viscosity number is further refined by the auto-calibration function (block 214), described in greater detail below.

By way of example, if the "gross" or initial power consumption of a motor 18 was calculated to be 200 watts, such figure would then have to be compensated for. Thus, if the motor were 90% efficient at the particular sensed voltage, the load value would be reduced to 180 watts, as determined from the data in the motor curve table. The resultant number would be converted to the viscosity scale by use of the second table, to a viscosity of, for example, 1. If the amount of the auto-calibration were a −1, then the resultant "net" or adjusted viscosity would be 0. As indicated in box 216, the final viscosity reading (block 218) is based upon the average of five previous calculations.

Figure 12:
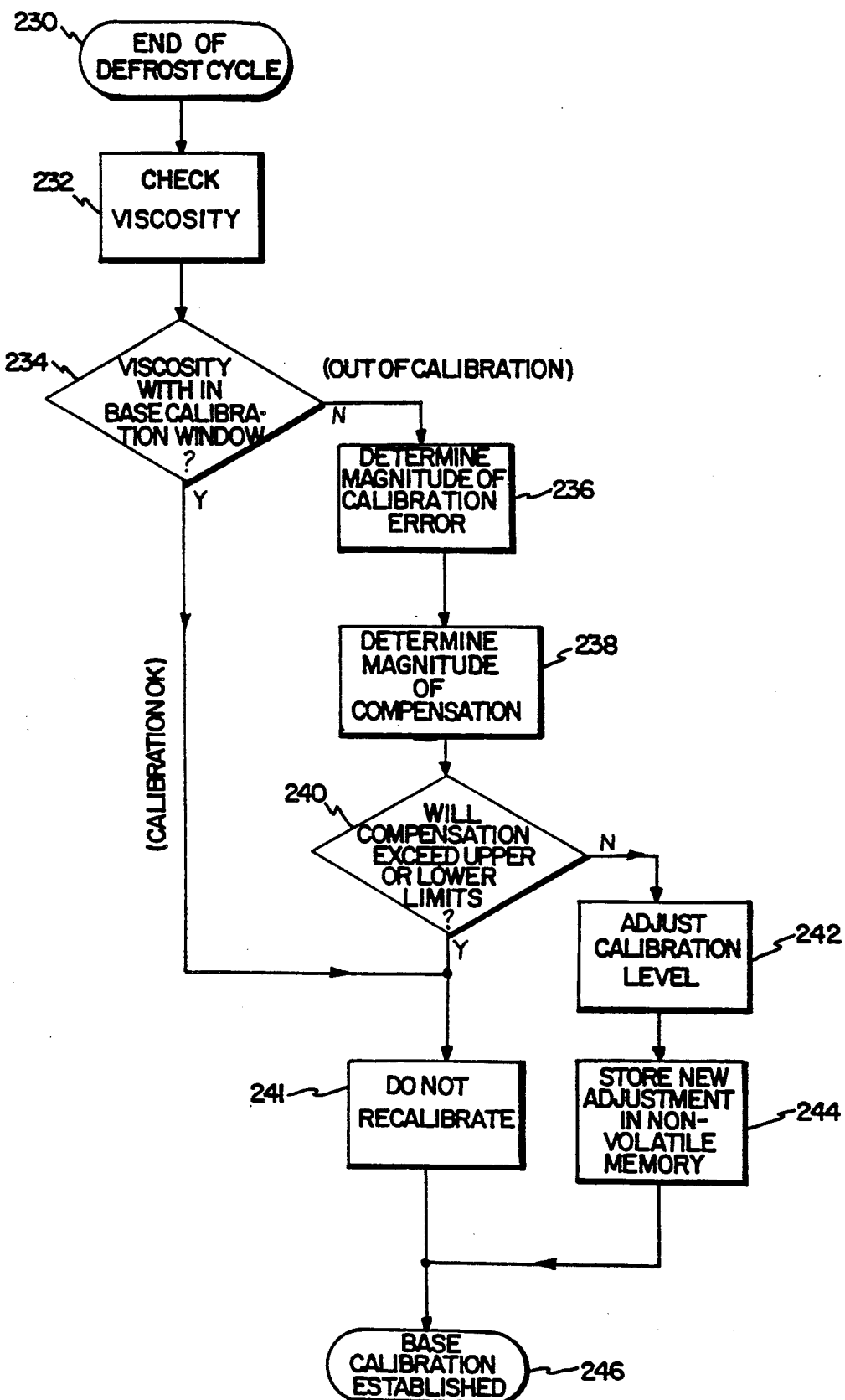
FIG. 12 shows a flow diagram of the recalibrating function of the present invention.

The present invention provides for the recalibrating of the zero viscosity set point for each cylinder 20a and 20b. It can be understood that at the end of each defrost cycle the beverage is completely liquid and, therefore, provides a point in time at which beverage viscosity is known to be zero. Thus, the only drag on a harvesting drive motor results from the resistance contributed by the motor itself, the friction of the harvesting assembly moving against the beverage cylinder walls, and any friction inherent in the drive train means connecting each motor to its corresponding scraping assembly. Therefore, changes over time in such cumulative load above or below the original setting, can be compensated for by the recalibration program of the present invention. The manner of re-referencing a new zero point can be understood by referring to the functional flow diagram thereof, as seen in FIG. 12. At the end of a defrost cycle (block 230) the viscosity value of the last defrost cycle (block 232) is obtained. If the difference between the new viscosity value and zero exceeds a base calibration window setting, (block 234), calibration is necessary. The overall difference between the old and new viscosity readings is determined in block 236, after which a decision is made as to the magnitude of the recalibration (block 238). At decision block 240 it must be determined whether or not the proposed recalibration would result in the calibration adjustment exceeding a predetermined range. It can be understood that recalibration should not be permitted beyond a certain limit, as a very low or high resistance relative to the original setting may be indicative of mechanical failure wherein an attempt to recalibrate to such a level could be deleterious to the machine or create a hazardous situation. In the present invention the recalibration range is plus or minus 20 viscosity points from the original set-point. If the proposed adjustment is outside of that range no recalibration is done (block 241). If the adjustment is acceptable, the adjustment is made (block 242), and the amount thereof is stored in EEPROM 110c or standby RAM 110d, (block 244). The new zero point is then established (block 246). A better understanding of the recalibration function can be had by way of numerical example, wherein, if the original set point is zero, the recalibration window is 3, and upon subsequent defrost the viscosity reading is 5, then the difference there between exceeds 3 and recalibration should be done. The total difference is, of course 5, and the magnitude of the adjustment can be a set figure, such as 1, or can be variable over a set range of, for example, up to 5 viscosity points. Thus, if the magnitude of change allowable is from 1 to 5, and the adjustment value selected is the maximum possible, 5, then the adjustment would be a minus 5 to reduce the set point again to zero. The amount of change, −5, is stored in EEPROM 110c. At the next defrost cycle, if the viscosity reading is 5, relative to the new set point, the same procedure follows wherein a −5 change is affected. The adjustment number saved in EEPROM 110c, however is not −5 but the total of all adjustments, in this case −10. This stored adjustment number is the cumulative or running total of the amount of each recalibration done at block 242. It can now be appreciated that it is the stored adjustment number that is looked at in block 240 whereby the determination is made whether or not the acceptable calibration range of plus or minus 20 has been exceeded. It will be understood by those of skill, that many variations to the recalibration software can be made to tailor operation to a particular set of circumstances. The magnitude of adjustment can be set at a constant small value if conservative adjustments are deemed desirable.

In the present invention, viscosity is controlled in accordance with a three level system as seen in chart A, below.

CHART A

| Low | Middle | High |
|-----|--------|------|
| 7   | 12     | 16   |
| 8   | 14     | 18   |
| 9   | 16     | 20   |
| 10  | 18     | 22   |
| 11  | 20     | 24   |
| 12  | 22     | 26   |

Figure 13:
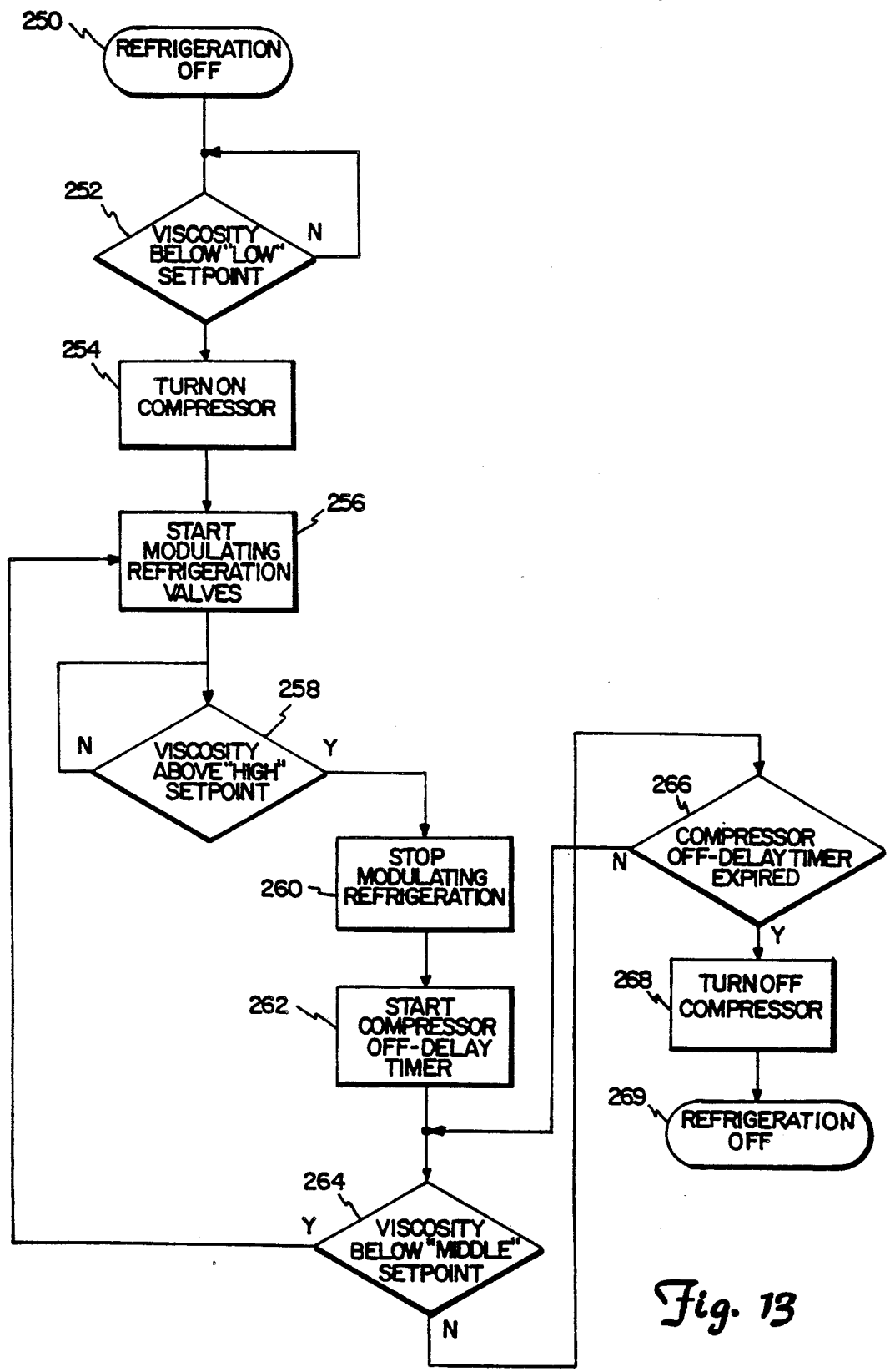
FIG. 13 shows a flow diagram of the viscosity control of the present invention.

The low numbers represent the viscosity settings normally displayed and selectable by the operator of machine 10, each setting representing a predetermined set of three viscosity numbers. Thus, if a viscosity of 9 is selected, the corresponding middle number would be 16 and the high number 20. The manner of control of the viscosity in a cylinder of machine 10, cylinder 20a in this example, can now be understood by reference to FIG. 13, showing the functional flow of the programming of the present invention relating to viscosity control. Assuming refrigeration is off (block 250), processor 110 will be continually and periodically determining viscosity (block 252), as described above. If the viscosity is below the selected low setting, 9 for example, compressor 28 will be turned on (block 254) and valve 32a will begin to modulate (block 256), thereby sending refrigerant through coil 33a resulting in the cooling of the beverage in cylinder 20a. Such cooling will continue as long as the sensed viscosity is below the high setting of 20 in this example (block 258). Once the sensed viscosity equals or exceeds the high number, the modulating of expansion valve 32a will be stopped (block 260), thereby discontinuing the freezing of the beverage within cylinder 20a. However, compressor 28 continues to run. A twenty-second timer commences at the stopping of the modulating of valve 32a (block 262). Discontinuing modulating, i.e., closing of normally closed valve 32a, terminates the freezing of further beverage. Thus, it can be understood that the resultant scraping load on motor 18a will be quickly eliminated, wherein any further load value in excess of the zero point will be due solely to the viscosity of the beverage. If such viscosity reading goes below the middle value, 16 in our example, prior to the expiration of the twenty-second time period, expansion valve 32a will again start to modulate causing further refrigeration of cylinder 20a (block 264). The twenty-second clock will be reset each time the viscosity goes below the middle value and the refrigeration valve 32a is again modulated. This loop will continue unless and until the viscosity stays above the middle value for the entire twenty-second time period (block 266). If the twenty-second clock expires and the viscosity remains above the middle set value, compressor 28 will then be turned off (block 268), stopping refrigeration (block 269). Compressor 28 will be turned on again and valve 32a modulated once the viscosity is seen to go below the low set point. Valves 32a and 32b are modulated on the basis of the temperature difference between each inlet 37a and 37b and common outlet 34. Thus, sensors 36a, 36b and 38 provide such temperature information to processor 110 so that valves 32a and 32b provide for the proper flow of refrigerant. Various pulse modulating strategies are known in the prior art. In the present invention, processor 110 samples the inlet and outlet temperature difference of each coil 32a and 32b every ten seconds. The on-time, or length of any pulse, is related to the temperature difference, wherein the greater the difference, the longer the valve is held open. Whereas, the expansion valve off-time is set at 0.5 seconds. A representative example of such a relationship is seen in Chart B, below, relating to single cylinder operation wherein the expansion valve is modulated at a base rate of 62% for a fixed period of 30 seconds. Chart C, below, shows such data relating to the refrigeration of both cylinders simultaneously wherein both valves are modulated at a base rate of 37% for a fixed period of 30 seconds.

CHART B

| Temperature Difference Inlet/Outlet °F. | On-Time (Miliseconds) | Percentage On |
|---|---|---|
| Less Than 0 | 509 | |
| 1-5 | 150 | 23% |
| 6-10 | 300 | 37% |
| 11-15 | 600 | 54% |
| 16-20 | 700 | 58% |

CHART C

| Temperature Difference Inlet/Outlet °F. | On-Time (Miliseconds) | Percentage On |
|---|---|---|
| Less Than 0 | 255 | |
| 1-5 | 50 | 9 |
| 6-10 | 100 | 17 |
| 11-15 | 250 | 33 |
| 16-20 | 300 | 37 |

In this manner, the present invention provides for very accurate control over the viscosity of the frozen beverage by the use of a particular control scenario wherein the sensed load on a beater motor in excess of a zero value is due to the degree of viscosity of the beverage alone, the other load components having been factored out. In addition, the three level system in combination with the control program serves to insure that the beverage is "truly" at the desired viscosity before the compressor is turned off, thereby preventing harmful short-cycling thereof. It will be appreciated by those of skill that the values of table A are determined upon the basis of the desired degree of control of the acceptable range of viscosity for a particular setting. The viscosity range for a particular setting is the difference between the corresponding low and high numbers. Moreover, it will be understood by those of skill, that the values of table A and the numerical data of the first and second tables relating to efficiency curves and power to viscosity conversion, are highly dependent upon many variables, such as the particular beater motor used, the size of the freezing cylinders, and the like. Thus, it will be appreciated that such numbers must be experimentally determined for each particular application.

Figure 14B:
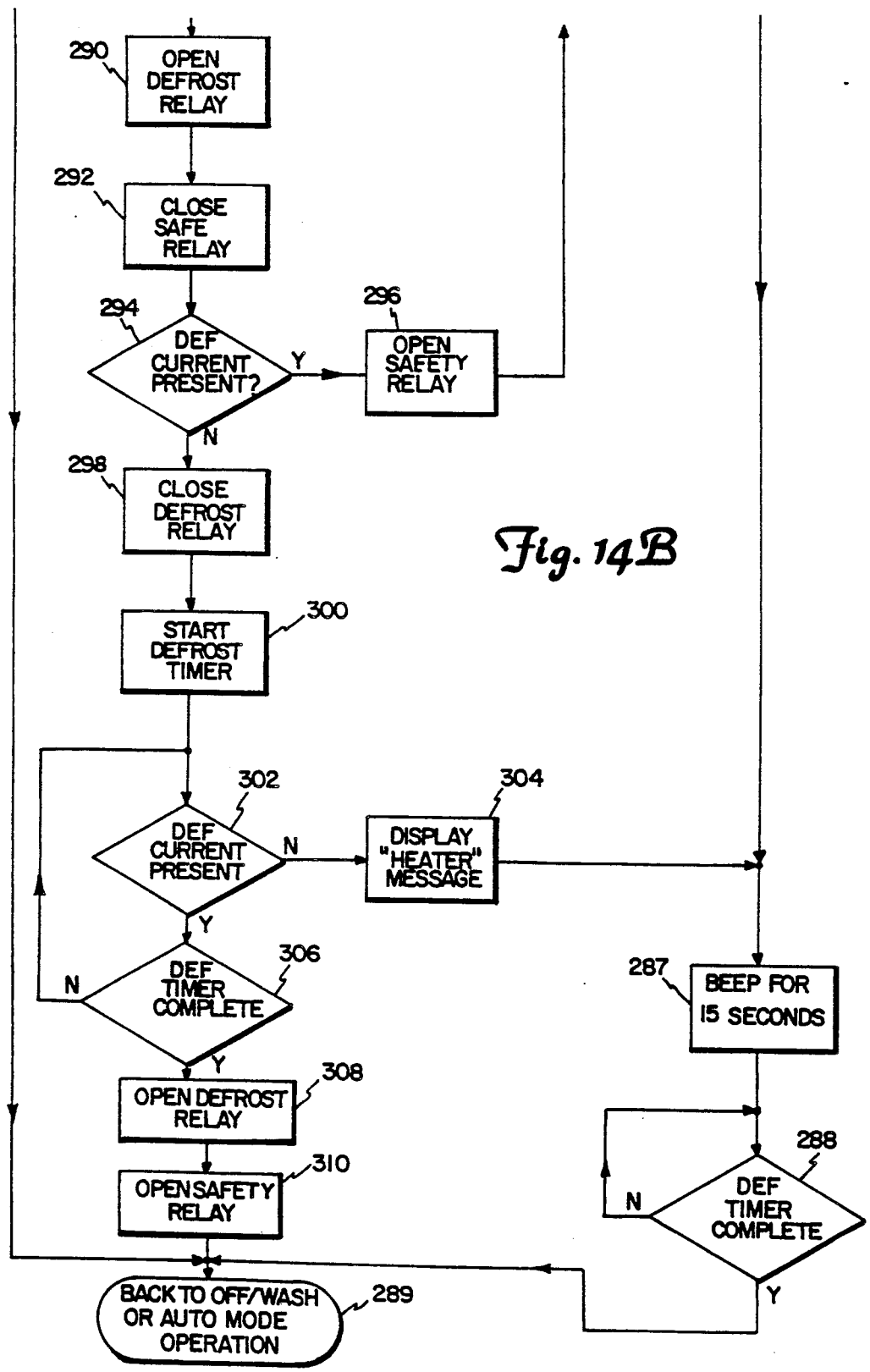
FIG. 14 shows a flow diagram of the safety defrost cycle function of the present invention.

An understanding of the safety defrost function of the present invention can be had by referring to the schematic diagram of FIG. 10 and the function flow diagram, as seen in FIG. 14. At block 270, F.C.B. machine 10 is in a particular mode, such as refrigeration, wash, or off. In any such mode, both relay contacts 172 and 174 are open and the output of sensor 146a is continually looked at to see if current is present (block 272). If current is present, even though both relays 172 and 174 are supposed to be open, it is clear by review of FIG. 10, that a dangerous fault condition exists. Therefore, an "unplug" message is shown in display 12b (block 274) and alarm 143 is sounded continuously (block 276). Defrost can be selected manually by use of a specific display switch 12a, therefor, or can be initiated automatically based upon a pre-programmed defrost time (block 278). When the defrost cycle is initiated, defrost relay 172 is first closed (block 280), after which a flow of current is checked by sensor 146 (block 282). It can be appreciated by review of FIG. 10 that, if both relays 172 and 174 are open, yet current is sensed upon the closing of relay 172, a potential hazard situation exists. Thus, relay 172 is opened (block 284), an error message is displayed (block 286) indicating a relay problem, after which the alarm is sounded for 15 seconds (block 287). Machine 10 is returned to the original mode (block 289) after completion of defrost timer (block 288). If, after the closing of defrost relay, no current is sensed (block 282), defrost relay 172 is reopened (block 290), after which safety relay 174 is closed (block 292). If current is again detected (block 294), it can be appreciated that the same error message and alarm would occur as, again, a hazard situation may exist. Thus, it can be seen that the control of the present invention provides for independent testing of each relay 172 and 174. If, after testing of each relay, no unexpected current flow is detected, defrost relay 172 is closed (block 298) and a defrost timer is started (block 300). If defrost current does not exist (block 302), a message will be displayed (block 304) indicating a lack of heat or heater error, whereupon alarm 143 will be sounded for a period of time, such as 15 seconds, (block 287). If current exists at (block 306), defrost will continue in the loop until the defrost timer has expired (block 306). The defrost period having ended, defrost relay 172 is opened (block 308) and safety relay 174 is opened (block 310). Machine 10 is then returned to original mode of operation (block 289).

As is known in the art, touch switches 12a, as specifically listed and named in FIG. 9, are used to control the operation of machine 10, such as to initiate refrigeration, start a defrost cycle and the like. As is also understood, switches 12a can be used to obtain information concerning the current operating status of its various components. Machine 10 includes a display mode wherein such information can be accessed, and wherein certain functions of the machine can be programed. The present invention also provides for a diagnose function in addition to a display function. The operation of the display and diagnose functions can be understood by referring to FIG. 15. At any time during the operation of machine 10 (block 320), switches 12a are used to enter the display mode (block 322). Thus, various display functions can be selected by incrementing through and individually selecting the one of interest. The particular switch or switches used for entering the display mode and for incrementing and selecting is arbitrary and well within the skill of the art and, therefore, in the interest of efficiency of description herein, need not be explained in detail. The display functions are: diagnose (block 324), defrost (block 326), time (block 328), sleep (block 330), wake up (block 332), viscosity set (block 334), viscosity read (block 336), sensors (block 338) and voltage (block 340). If the particular block 324-340 is selected, then the related message is displayed and the opportunity for a new setting adjustment, or display of an operating status message, is provided (blocks 342-356). As control 100 includes a clock 128, the selection of the time function permits the setting thereof and the display of the current time. The selection of the sleep and wake-up functions permit the setting and display of individual times at which it may be desirable to have machine 10 automatically turn off and subsequently to turn on so that refrigeration does not occur during times of predictable inactivity. Selection of the defrost function permits the programming and display of times during the day at which the automatic initiation of a defrost cycle is desired. In the present embodiment, for example, up to nine different defrost times are permitted, with a minimum of 2 hours between any two defrosts. In addition, the programming of control 100 does not permit the simultaneous defrosting of both cylinders, so that dispensable beverage is always available from at least one cylinder. The viscosity set function allows the selection and display of the particular viscosity setting from 7 to 12, as per Table A herein. The viscosity read function allows the individual display of the actual viscosity reading of each cylinder. The sensors function permits the separate display of the temperatures at both inlets 37a and 37b as indicated by sensors 36a and 36b, and of outlet 34 as indicated by sensor 38. Selection of voltage function allows the display of the voltage of lines L1 and L2. A particular switch 12a is designated to back-up out of the menu mode represented by block 357 to exit to the original operating mode (block 358).

Figure 15A:
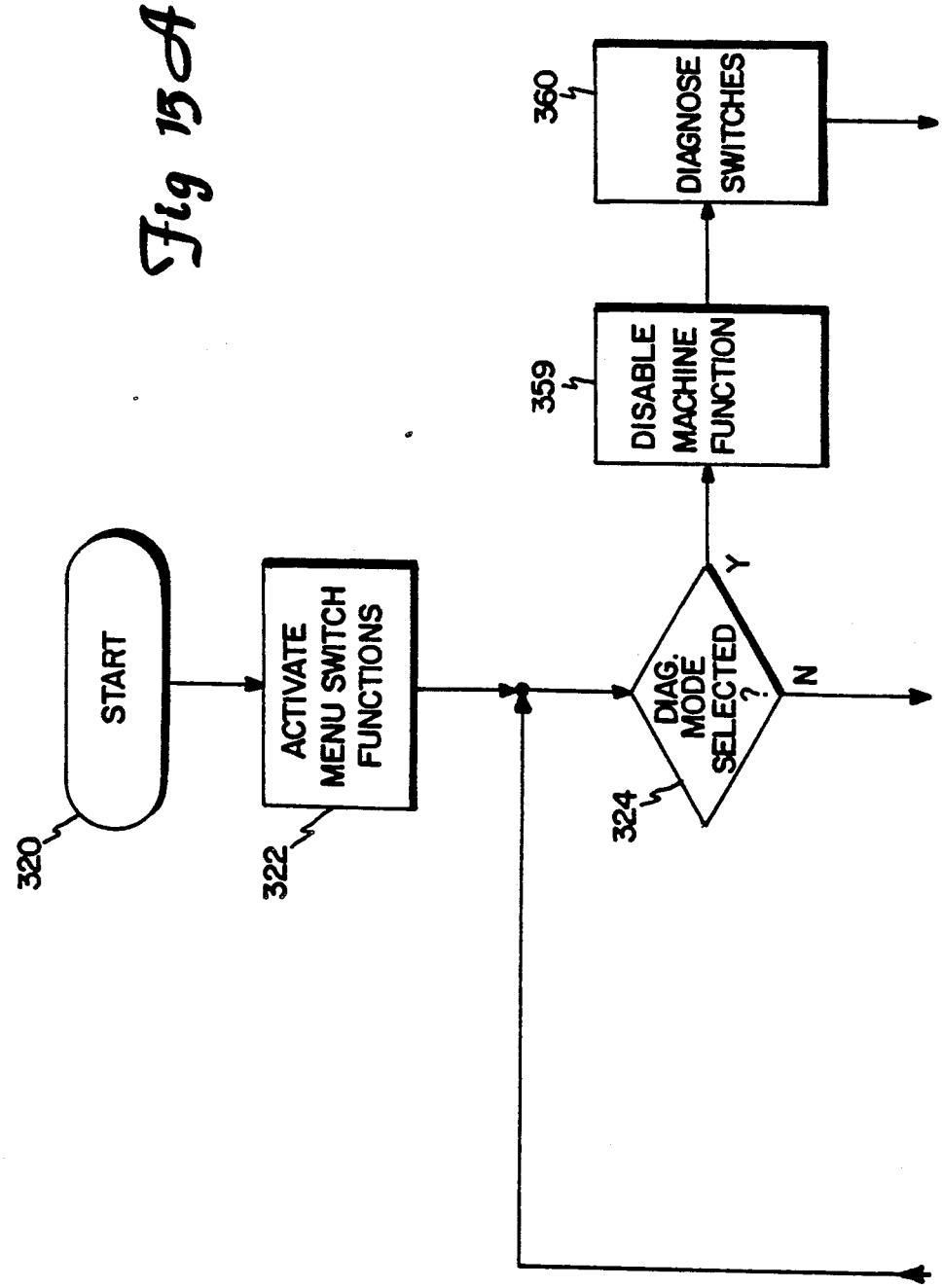
FIG. 15 shows a flow diagram of the display and diagnose control of the present invention.
Figure 15B:
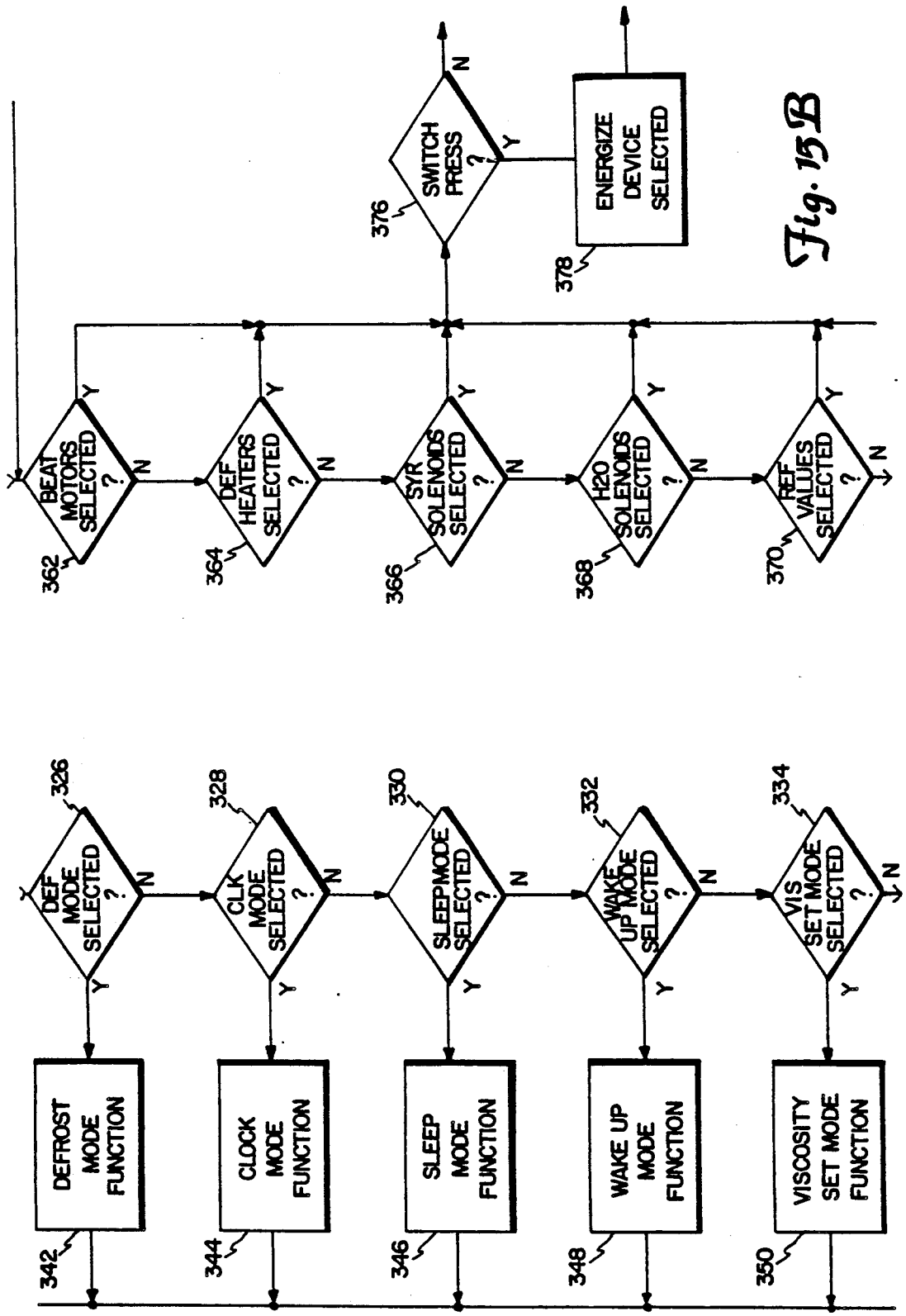

As seen in FIG. 15, selection of the diagnose function (block 324) first signals processor 110 to cut power to all the components of machine 10 (block 359), followed by the incrementing through sub-functions thereof (block 360) by repeated actuating of a switch 12a and selection of the particular function (block 376) by the actuating of a further designated switch 12a. The sub-functions are: motors (block 362), heaters (block 364), syrup (block 366), water (block 368), valves (block 370), compressor (block 372) and pump (block 374). Selection of the motors, heaters, syrup, water or valves functions, allows the individual analysis of the operation of either motor 18a or 18b, heater pair 46a or 46b, syrup solenoids 75a or 75b, carbonated water solenoids 85a or 85b, or expansion valves 32a or 32b. Once a particular component has been selected, checking the operation thereof is accomplished by the temporary energizing of each component separately through the brief pushing of a designated switch 12a (block 378). It will be understood that each function block 362-370 actually represents a sub-selection between the related component for each cylinder 20a and 20b. Block 380 represents the use of a designated switch 12a that allows for backing out of the diagnose or display functions, to the original operating modes (blocks 392). It can now be appreciated that the operation of various critical components of machine 10 can be checked initially very quickly by simply listening for such operation and/or the sounds made by the energizing of associated relays or solenoids. In addition, the diagnose function can allow for more quantitative analysis of critical component function through the use of voltage or ohm meters, and the like.

Figure 16A:
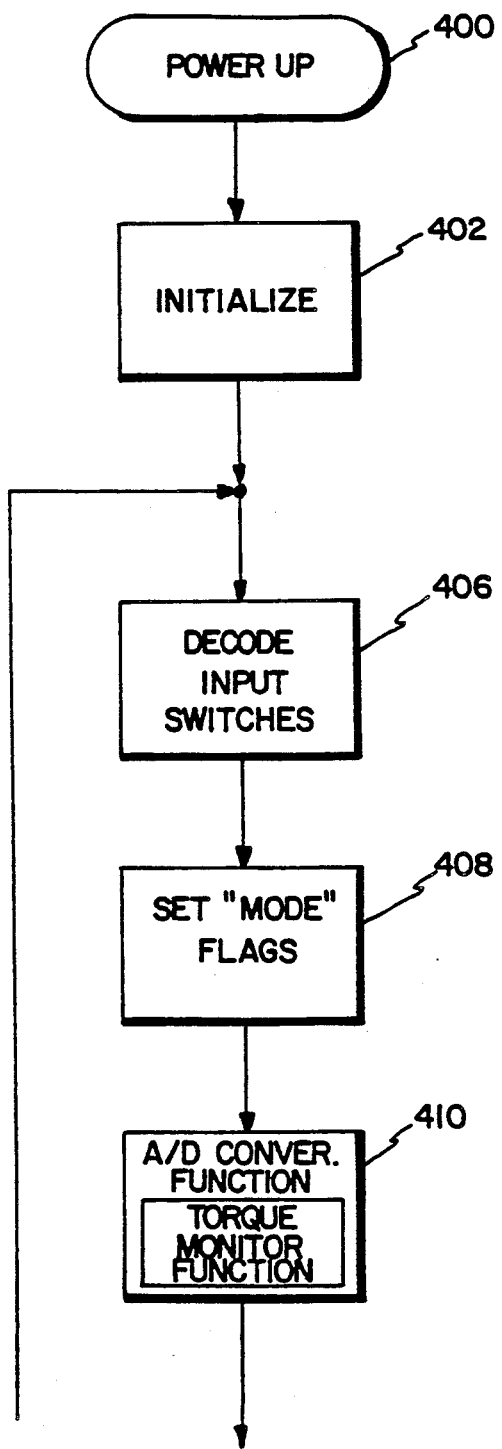
FIG. 16 shows a flow diagram of the overall operation of the control of the present invention.
Figure 16B:
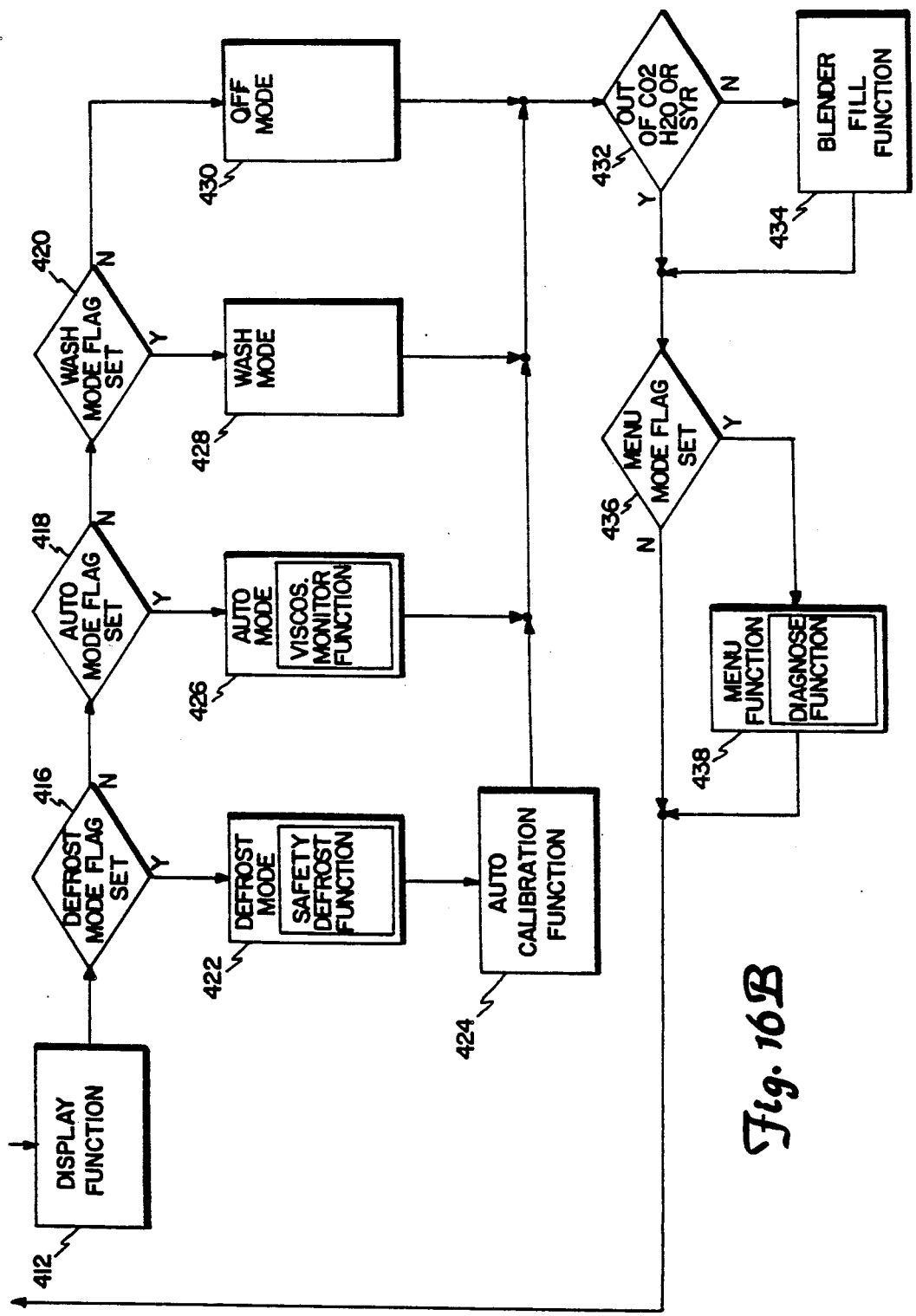
Figure 17:
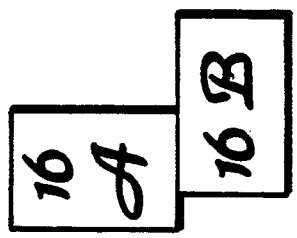
Figure 17:
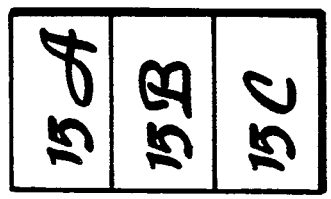
Figure 17:
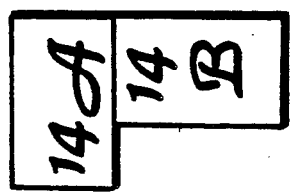
Figure 17:
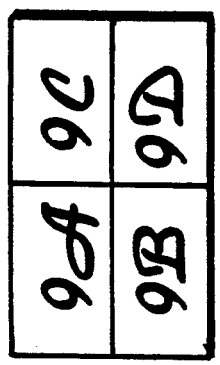

The overall operational control of machine 10 by the program of the present can be had by referring to FIG. 16. As seen therein, machine 10 is first powered-up (block 400), after which the initializing programming is started (block 402). It is understood by those of skill that an initialize program provides for a coordinated starting of machine 10 by control 100, by resetting the external input/output circuitry, clearing all user RAM and the like. After initialization, all input switches 12a are decoded (block 406), after which the mode flags are set (block 408). An analog-to-digital conversion function is then started (block 410). Block 410 includes the torque monitoring sub-routine of FIG. 11. A mode monitoring function is commenced at block 412, and display 12b is utilized to display the particular mode the machine is in, as determined by decision blocks 416, 418 and 420. Thus, if the defrost function is set (block 416), machine 10 goes into the defrost mode (block 422), which includes the defrost sub-routine as is described above in conjunction with FIG. 14. In addition, as previously explained, after each defrost cycle, machine 10 is recalibrated (block 424) as per the autocalibration sub-routine of FIG. 12. If the auto mode has been selected (block 418), machine 10 is refrigerating and producing frozen beverage (block 426). The automatic mode includes the viscosity monitor sub-routine of FIG. 12. If the wash mode is selected, (block 420), machine 10 goes through the wash mode wherein no refrigeration or heater operation occurs (block 428). If the defrost, automatic, or wash modes are not selected, machine 10 is in the off mode (block 430). Control 100 of machine 10 is always monitoring carbon dioxide pressure with sensor 61, water pressure with sensor 80, and for the presence or lack of syrup with sensors 74a and 74b. If these sensors indicate deficiencies of carbon dioxide pressure, water pressure or lack of syrup (block 432), a message is displayed indicating such a problem. If no such deficiencies are seen, the blender bottle fill function (block 434) will not be disabled. The bottles 65 and 66 will be allowed to fill in response to level sensors 86a and 86b by operation of valves 85a and 86b and 75a and 75b. If, during any mode, a "menu" flag is set (block 436) the display function can be entered (block 438). The display function includes the display/diagnose sub-routine of FIG. 15.

It will be understood serial communication 110b allows for access to all variables stored in the microprocessor (RAM, EEPROM, etc.). Such information can include the viscosity set-points of cylinders 20a and 20b, the cumulative auto-calibration total for each cylinder, the pre-set automatic defrost times, and the sleep and awake times.

The present invention has been described herein with reference to various preferred embodiments. However, those of skill in the art will recognize that changes may be made in form and detail to the present invention without departing from the spirit and scope thereof.

We claim:

1. A frozen carbonated beverage machine including: a freezing container for retaining and producing the beverage therein,
   refrigeration means including a compressor, and an evaporator, the evaporator secured to the exterior of the freezing container for providing freezing of the beverage retained therein and the evaporator having expansion valve means for regulating the flow of refrigerant therethrough,
   harvesting means in the freezing cylinder for harvesting frozen beverage from the interior surface thereof,
   a drive motor for operating the harvesting means,
   electronic control means, the control means having a microprocessor operated in accordance with a microprocessor program for controlling the operation of the drive motor, the compressor and the expansion valve, the microprocessor receiving signals from a torque sensing means, the torque sensing means connected to the drive motor, the microprocessor for periodically determining the drive motor torque from the input of the torque sensing means and for periodically comparing the determined torque during refrigeration of the beverage with a high torque value for stopping the operation of the expansion valve when the sensed viscosity is equal to or greater than the high value for discontinuing further refrigeration of the beverage, and the control means including timing means for commencing a predetermined time period at the stopping of the operation of the expansion valve and the control re-operating the expansion valve if the sensed torque value goes below a middle torque value during the predetermined time period so that refrigeration of the beverage is re-initiated.

2. The machine as defined in claim 1, and the microprocessor re-setting the pre-determined time period each time the valve is re-operated if the determined torque falls below the middle value.

3. The machine as defined in claim 2, and the microprocessor stopping the operation of the compressor if the determined torque does not go below the middle value prior to the expiration of any commenced pre-determined time period.

4. The machine as defined in claim 3, and the control further including efficiency compensating means having voltage sensing means, the compensating means for determining the efficiency of operation of the drive motor as a function of the sensed voltage supplied thereto and for adjusting the determined torque in accordance with the determined efficiency.

5. The machine as defined in claim 1, and the electronic control providing for converting of each adjusted torque value to a corresponding viscosity value of a viscosity scale, and the viscosity having a zero value relating to a determined torque when the beverage is completely liquid.

6. The machine as defined in claim 5, the control providing for a defrost cycle so that the semi-frozen beverage can be completely melted and so that the viscosity scale can be established by the conversion of a corresponding torque determination made at the end of a defrost cycle.

7. The machine as defined in claim 6, the control having recalibrating means for recalibrating the zero point of the viscosity scale at the end of each defrost cycle.

8. The machine as defined in claim 1, and the electronic control having means for converting of each determined torque value to a corresponding viscosity value of a viscosity scale, and the viscosity scale having a zero value relating to a determined torque when the beverage is completely liquid.

9. The machine as defined in claim 8, the control providing for a defrost cycle so that the semi-frozen beverage can be completely melted and so that the viscosity scale can be established by the conversion of a corresponding torque determination made at the end of a defrost cycle.

10. The machine as defined in claim 9, the control having recalibration means for recalibrating the zero point of the viscosity scale at a point in time when the beverage is completely liquid.

11. The machine as defined in claim 1, and the electronic control having a diagnostic means and user operable switches and visual display for enabling the incrementing through and selection of a plurality of machine components by operation of the switches and viewing of the display, and for energizing each selected component individually by operation of a designated switch so that operation of the component can be checked.

12. The machine as defined in claim 1, and further including an electric defrost heater, the heater having an outer housing portion secured in close association with the cylinder and having a heater element held within the housing and removable therefrom.

13. The machine as defined in claim 1, and the evaporator having inlet and outlet temperature sensing means for operating the expansion valve in accordance with the difference between the sensed evaporator inlet and outlet temperatures.

14. The machine as defined in claim 13, and the expansion valve being a normally closed pulse modulated expansion valve and the control means connected to the inlet and outlet sensing means for operating the expansion valve in accordance with the sensed temperature difference.

15. The machine as defined in claim 1, and the control operating the compressor and the expansion valve when the determined torque is below a third low torque value for providing freezing of the beverage in the cylinder and the control re-setting the pre-determined time period each time the valve is re-operated if the determined torque falls below the middle value.

16. The machine as defined in claim 15, and the control means stopping the operation of the compressor if the determined torque value does not go below the middle torque value prior to the expiration of any commenced pre-determined time period.

17. The machine as defined in claim 16, and the control means re-starting the operation of the compressor if the determined torque falls below the low torque value.

18. The machine as defined in claim 17, and the control further including efficiency compensating means having voltage sensing means, the compensating means for determining the efficiency of operation of the drive motor as a function of the sensed voltage supplied thereto and for adjusting the determined torque in accordance with the determined efficiency.

19. The machine as defined in claim 18, and the electronic control providing for converting of each adjusted torque value to a corresponding viscosity value of a viscosity scale, and the viscosity having a zero value relating to a determined torque when the beverage is completely liquid.

20. The machine as defined in claim 19, the control providing for a defrost cycle so that the semi-frozen beverage can be completely melted and so that the viscosity scale can be established by the conversion of a corresponding torque determination made at the end of a defrost cycle.

21. The machine as defined in claim 20, the control having recalibrating means for recalibrating the zero point of the viscosity scale at the end of each defrost cycle.

22. A machine for producing a partially frozen beverage, comprising:
- a freezing container for retaining and producing the beverage therein,
- refrigeration means including a compressor, and an evaporator, the evaporator secured to the exterior of the freezing container for providing freezing of the beverage retained therein and the evaporator having expansion valve means for regulating the flow of refrigerant therethrough,
- harvesting means in the freezing cylinder for harvesting frozen beverage from the interior surface thereof,
- a drive motor for operating the harvesting means,
- electronic control means, the control means having a microprocessor operated in accordance with a microprocessor program for controlling the operation of the drive motor, the compressor and the expansion valve, the microprocessor receiving signals from a torque sensing means, the torque sensing means connected to the drive motor, the microprocessor for periodically determining the drive motor torque from the input of the torque sensing means and for converting the sensed motor torque to a viscosity value with a zero point thereof relating to a sensed torque when the beverage is liquid, the control means for periodically comparing the determined viscosity value of the beverage during refrigeration thereof with a high viscosity value for stopping the operation of the expansion valve when the sensed viscosity is equal to or greater than the high viscosity value for discontinuing further refrigeration of the beverage, and the control means including timing means for commencing a predetermined time period at the stopping of the operation of the expansion valve and the control re-operating the expansion valve if the sensed viscosity value goes below a middle viscosity value during the predetermined time period so that refrigeration of the beverage is re-initiated.

23. The machine as defined in claim 22, and the control operating the compressor and the expansion valve when the sensed viscosity is below a pre-determined low viscosity value for providing freezing of the beverage in the cylinder and the control re-setting the predetermined time period each time the valve is re-operated if the sensed viscosity falls below the middle value.

24. The machine as defined in claim 23, and the control means stopping the operation of the compressor if the sensed viscosity value does not go below the middle set viscosity value prior to the expiration of any commenced pre-determined time period.

25. The machine as defined in claims 24, and the control means re-starting the operation of the compressor if the sensed viscosity falls below the low viscosity value.

26. The machine as defined in claims 25, and the control further including efficiency compensating means having voltage sensing means, the compensating means for determining the efficiency of operation of the drive motor as a function of the sensed voltage supplied thereto and for adjusting the determined torque in accordance with the determined efficiency.

27. The machine as defined in claim 26, and the electronic control providing for converting of each adjusted torque value to a corresponding viscosity value of a viscosity scale, and the viscosity having a zero value relating to a determined torque when the beverage is completely liquid.

28. The machine as defined in claim 27, the control providing for a defrost cycle so that the semi-frozen beverage can be completely melted and so that the viscosity scale can be established by the conversion of a corresponding torque determination made at the end of a defrost cycle.

29. A machine for producing a semi-frozen beverage, comprising:
- a freezing container for retaining and producing the beverage therein,
- refrigeration means including a compressor, and an evaporator, the evaporator secured to the exterior of the freezing container for providing freezing of the beverage retained therein and the evaporator having expansion valve means for regulating the flow of refrigerant therethrough,
- harvesting means in the freezing cylinder for harvesting frozen beverage from the interior surface thereof,
- a drive motor for operating the harvesting means,
- electronic control means, the control means having a microprocessor operated in accordance with a microprocessor program contained in memory means connected to the microprocessor for controlling the operation of the drive motor, the compressor and the expansion valve, the microprocessor receiving signals from a torque sensing means, the torque sensing means connected to the drive motor, the microprocessor for periodically determining the drive motor torque from the input of the torque sensing means and for converting the sensed motor torque to a viscosity value with a zero point thereof relating to a sensed torque when the beverage is liquid, the control means for periodically comparing the determined viscosity value of the beverage during refrigeration thereof with a selected low viscosity value for opening the expansion valve and operating the compressor when the sensed viscosity is below the low value, and the control means for closing the expansion valve when the sensed viscosity is equal to or greater than a selected high viscosity value, and the control means including timing means for commencing a predetermined time period at the closing of the expansion valve and the control reopening the expansion valve if the sensed viscosity value goes below a selected middle viscosity value during the predetermined time period.

30. The machine as defined in claim 29, and the control re-setting the pre-determined time period each time the valve is re-opened if the sensed viscosity falls below the middle value.

31. The machine as defined in claim 30, and the control means stopping the operation of the compressor if the sensed viscosity value does not go below the middle viscosity value prior to the expiration of any commenced pre-determined time period.

32. The machine as defined in claim 31, and the low, middle and high viscosity values stored in the memory means as a plurality of individually selectable pre-determined three value sets.

33. The machine as defined in claim 32, and the control further including efficiency compensating means having voltage sensing means, the compensating means for determining the efficiency of operation of the drive motor as a function of the sensed voltage supplied thereto by the voltage sensing means and for adjusting the determined torque in accordance with the determined efficiency prior to the conversion thereof to a corresponding viscosity value.

34. The machine as defined in claim 33, the control providing for a defrost cycle so that the semi-frozen beverage can be completely melted and so that the viscosity scale zero point can be established corresponding to a torque determination made at the end of a defrost cycle.

35. The machine as defined in claim 34, and the electronic control having recalibration means for recalibrating the zero point of the viscosity scale at the end of each defrost cycle.

36. The machine as defined in claim 35, and the electronic control having a diagnostic control for enabling the incrementing through and selection of a plurality of machine components and for energizing each component individually to check on the operation thereof.

37. A method of accurately maintaining the viscosity of a semi-frozen beverage for dispensing thereof from a frozen carbonated beverage machine, the beverage machine having a freezing cylinder for producing the beverage and dispensing the beverage therefrom, and refrigeration means including a compressor and an evaporator the evaporator having an expansion valve for regulating the flow of refrigerant therethrough, and having harvesting means and a drive motor for operating the harvesting means, the harvesting means retained in the cylinder for providing harvesting of a semi-frozen portion of the beverage from the interior surface thereof, and control means for controlling the operation of the valve and the compressor in response to torque sensing means connected to the motor for determining the torque of the motor, the method comprising the steps of:
refrigerating the beverage by operating the compressor and valve,
periodically and continually sensing the torque on the motor,
stopping refrigeration by closing the valve when the sensed torque exceeds a predetermined high torque value and initiating a pre-determined time period, the time period commencing at the closing of the valve,
re-operating the valve if the sensed torque falls below a middle torque value within the predetermined time period for re-initiating refrigerating of the beverage, and re-setting the time period each time the valve is re-operated.

38. The method as defined in claim 37, and further including the step of stopping the operation of the compressor if the sensed torque value does not fall below the middle value during the running of a set time period.

39. The method as defined in claims 38, and further including the step of converting the determined torque value to a corresponding viscosity value of a viscosity scale, the viscosity scale having a zero point relating to a determined torque when the beverage is completely liquid.

40. The method as defined in claim 39, and further including the step of recalibrating the viscosity scale zero point when the beverage is completely liquid.

41. The method as defined in claim 40, and further including the steps of periodically defrosting the semi-frozen beverage and recalibrating the viscosity scale zero point at the end of each defrosting when the beverage is completely liquid.

42. The method as defined in claim 37, and further including the steps of stopping the operation of the machine, incrementing through and selecting various operating components of the machine and individually energizing each sub-component to check the operation thereof.

43. The method as defined in claim 37, and further including the step of adjusting the determined torque to compensate for the efficiency of operation of the drive motor.

44. A machine for producing a partially frozen beverage, comprising:
a freezing container for retaining and producing the beverage therein,
refrigeration means including a compressor, and an evaporator, the evaporator secured to the exterior of the freezing container for providing freezing of the beverage retained therein and the evaporator having expansion valve means for regulating the flow of refrigerant therethrough,
harvesting means in the freezing cylinder for harvesting frozen beverage from the interior surface thereof,
a drive motor for operating the harvesting means,
electronic control means, the control means having a microprocessor operated in accordance with a microprocessor program for controlling the operation of the drive motor, the compressor and the expansion valve, the microprocessor receiving signals from a torque sensing means, the torque sensing means connected to the drive motor, the microprocessor for periodically determining the drive motor torque from the input of the torque sensing means and for converting the sensed motor torque to a viscosity value with a zero point thereof relating to a sensed torque when the beverage is liquid, and having recalibrating means for comparing the determined viscosity at the liquid point with a previously determined liquid point viscosity and re-setting the zero point to a new zero point if the determined liquid point torque exceeds the previous such zero point by a predetermined margin.

45. The beverage machine as defined in claim 44, and the recalibrating means keeping a running total of the sum of all recalibrations and preventing re-setting of the zero point if the sum of such further calibration would exceed a second predetermined range.

46. The beverage machine as defined in claim 45, and the recalibrating means providing for varying the magnitude of the recalibration.

47. A method for recalibrating a machine for producing a semi-frozen beverage, the machine having a freezing container for retaining and producing the beverage therein, refrigeration means including a compressor, and an evaporator, the evaporator secured to the exterior of the freezing container for providing freezing of the beverage retained therein and the evaporator having expansion valve means for regulating the flow of refrigerant therethrough, harvesting means in the freezing cylinder for harvesting frozen beverage from the interior surface thereof, a drive motor for operating the harvesting means, control means for receiving signals from a torque sensing means, the torque sensing means connected to the drive motor, the control for periodically determining the drive motor torque from the input of the torque sensing means, and the control means having conversion means for converting the determined torque to a viscosity scale, the steps comprising: determining the torque of the motor at a point where the viscosity of the beverage is known to be zero, comparing the determined viscosity at the liquid point with a previously determined liquid point viscosity, re-setting the zero point to a new zero point if the determined liquid point torque exceeds the previous such zero point by a predetermined margin.

48. The method as defined in claim 47, and further including the steps of keeping a running total of the sum of all recalibrations and preventing the re-setting of the zero point if a further calibration, when added to the running total, would exceed a second predetermined range.

49. A machine for producing a partially frozen beverage, comprising: a plurality of electrically operable sub-components connected to an electronic control, the control also connected to a plurality of user operable switches and to a visual display and the control including diagnose means, the diagnose means providing for the incrementing through and the selection of each sub-component by operation of the switches and for individually energizing of the selected component by operation of a designated switch for checking the operation of the sub-component.

50. The machine as defined in claim 49, and the diagnose means providing for terminating the operation of all sub-components prior to the incrementing through, selecting and individual energizing thereof.

51. A method for checking the operation of a plurality of sub-components of a machine for producing a partially frozen beverage, the plurality of electrically operable sub-components connected to an electronic control, the control also connected to a plurality of user operable switches and to a visual display, the steps comprising: incrementing through and selecting a sub-component by operating the switches and viewing the display, energizing of a selected component by operation of a designated switch for checking the operation of the sub-component.

52. The method as defined in claim 51, and further including the step of stopping the operating of any sub-component prior to incrementing therethrough and the selecting and energizing thereof.

* * * * *